(12) United States Patent
Hirano et al.

(10) Patent No.: US 12,515,510 B2
(45) Date of Patent: Jan. 6, 2026

(54) VIBRATION DAMPING DEVICE

(71) Applicant: Sumitomo Riko Company Limited, Aichi (JP)

(72) Inventors: Masaaki Hirano, Aichi (JP); Takashi Kume, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 507 days.

(21) Appl. No.: 17/983,344

(22) Filed: Nov. 8, 2022

(65) Prior Publication Data
US 2023/0415559 A1  Dec. 28, 2023

(30) Foreign Application Priority Data

Jun. 27, 2022  (JP) ................. 2022-102837

(51) Int. Cl.
*B60K 5/12* (2006.01)
*F16F 13/10* (2006.01)
*F16F 13/30* (2006.01)

(52) U.S. Cl.
CPC ............ *B60K 5/1283* (2013.01); *F16F 13/10* (2013.01); *F16F 13/305* (2013.01);
(Continued)

(58) Field of Classification Search
CPC .......... F16F 13/10; F16F 15/03; F16F 13/305; F16F 13/30; F16F 7/1011; F16F 15/005; F16F 9/535; F16F 6/00; F16F 2222/06; F16F 2222/12; F16F 2224/045; F16F 9/532; F16F 1/361; F16F 9/53; F16F 2224/0283; F16F 2224/043; F16F 2228/066; F16F 2230/18; B60K 5/1283
See application file for complete search history.

(56) References Cited

U.S. PATENT DOCUMENTS 4,909,489 A * 3/1990 Doi .................... F16F 13/30
                                                267/141.2
5,050,850 A * 9/1991 Noguchi ............ F16F 13/1427
                                                188/267.1
(Continued)

FOREIGN PATENT DOCUMENTS

DE    102011117749    5/2013
DE    112021000031    1/2022
(Continued)

OTHER PUBLICATIONS

"Office Action of German Counterpart Application", issued on Nov. 13, 2023, with English translation thereof, pp. 1-16.

*Primary Examiner* — Robert A. Siconolfi
*Assistant Examiner* — Mahbubur Rashid
(74) *Attorney, Agent, or Firm* — JCIPRNET

(57) ABSTRACT

In a vibration damping device applying a magnetic force from a magnetic field generation unit to an orifice path communicating with fluid chambers into which a magnetic functional fluid is filled and controlling vibration damping properties. An intermediate cylindrical member to which an outer cylindrical member formed by a non-magnetic material is externally fit and fixed is formed by a ferromagnetic material. In the intermediate cylindrical member, a magnetic field acting opening part is provided at a position corresponding to the orifice path.

10 Claims, 14 Drawing Sheets

(52) U.S. Cl.
CPC ....... *F16F 2222/06* (2013.01); *F16F 2222/12* (2013.01); *F16F 2224/045* (2013.01); *F16F 2228/066* (2013.01); *F16F 2230/18* (2013.01)

(56) References Cited

U.S. PATENT DOCUMENTS

| | | | | |
|---|---|---|---|---|
| 5,165,668 | A | * | 11/1992 | Gennesseaux .......... F16F 13/28 267/140.15 |
| 5,299,788 | A | * | 4/1994 | Kanda .................... F16F 13/14 267/140.12 |
| 11,193,532 | B2 | | 12/2021 | Ito et al. |
| 11,378,152 | B1 | * | 7/2022 | Gaspar ................ F16F 13/1409 |
| 2007/0273073 | A1 | * | 11/2007 | Siemer ................... F16F 13/28 267/140.13 |
| 2020/0263731 | A1 | * | 8/2020 | Ito .......................... F16F 9/535 |
| 2020/0263755 | A1 | | 8/2020 | Ito et al. |
| 2020/0263756 | A1 | * | 8/2020 | Inoue ................ F16F 13/1481 |
| 2021/0381577 | A1 | * | 12/2021 | Ichikawa ................ F16F 13/10 |
| 2023/0407940 | A1 | | 12/2023 | Hirano et al. |

FOREIGN PATENT DOCUMENTS

| | | |
|---|---|---|
| JP | H039139 | 1/1991 |
| WO | 2023286397 | 1/2023 |

\* cited by examiner

VIBRATION DAMPING DEVICE

CROSS-REFERENCE TO RELATED APPLICATION

This application claims the priority benefit of Japan application serial no. 2022-102837, filed on Jun. 27, 2022. The entirety of the above-mentioned patent application is hereby incorporated by reference herein and made a part of this specification.

BACKGROUND

Technical Field

The disclosure relates to a fluid-filled vibration damping device using a flowing behavior of a fluid filled into a fluid chamber that is provided inside, and particularly relates to a fluid-filled vibration damping device adopting a magnetic functional fluid whose flowing properties, etc., change in accordance with a magnetic field change.

Description of Related Art

Conventionally, as a type of vibration damping device, a fluid-filled vibration damping device, which exerts a vibration damping effect by using a flowing behavior of a fluid filled therein with respect to a vibration input between an inner shaft member and an outer cylindrical member is known. Such vibration damping device is provided with a configuration in which the inner shaft member and the outer cylindrical member are linked by a main rubber elastic body. Such fluid-filled vibration damping device, for example, is not only applicable to an engine mount of a vehicle but may also be widely applied to a cab mount, a differential mount, a suspension mount, or a vibration damping bush, etc.

Meanwhile, since the vibration damping properties required for the vibration damping device differ as the input vibration or the traveling state of the vehicle, etc., differs, it is desired that the vibration damping properties that can be obtained by using the flowing behavior of the fluid are controllable from the outside.

Therefore, Japanese Patent No. H03-009139 (Patent Document 1) proposes an electrical rheological fluid-filled vibration damping device in which an electrical rheological fluid whose rheological degree changes with power supply is adopted, and the vibration damping properties are switchable by controlling the power supplied to the electrical rheological fluid. However, the vibration damping device as recited in Patent Document 1 requires that an electrode for power supply be provided inside to contact the electrical rheological fluid and power be supplied from the outside to the electrode. Therefore, the configuration or manufacture may easily become complicated.

Meanwhile, German Patent Publication No. 102011117749 (Patent Document 2) proposes a vibration damping device adopting a magneto-rheological fluid whose rheological degree changes in accordance with the magnitude of an acting magnetic field. With the magneto-rheological fluid, it is possible to apply and control the magnetic field from the outside of the fluid chamber. Therefore, it is not necessary to provide an electrode for power supply inside the fluid chamber as in the case for the electrical rheological fluid, and it is possible to simplify the manufacture of the configuration of the vibration damping device when compared to the electrical rheological fluid-filled type.

PRIOR ART DOCUMENTS

Patent Documents

[Patent Document 1] Japanese Patent No. H03-009139
[Patent Document 2] German Patent Publication No. 102011117749

However, in the case where a magnetic field generation unit applying the magnetic field to the magneto-rheological fluid is provided outside the fluid chamber, it is difficult to efficiently apply the magnetic field generated by the magnetic field generation unit to the magneto-rheological fluid.

Specifically, for example, as disclosed in FIGS. 2 and 3 of Patent Document 1, it is considered that the magnetic field generation unit is mounted to the outer circumferential surface of the outer cylindrical member in an externally inserted state. However, the point as to how to efficiently apply the magnetic field generated by such magnetic field generation unit to an orifice path of the magneto-rheological fluid filled in the fluid chamber is not considered. Therefore, it has become an issue that the vibration damping properties, which are the objective, are not sufficiently exhibited and that the magnetic field generation unit is required to have an excessive magnetic field generation ability and the energy efficiency is poor, etc.

SUMMARY

A vibration damping device, which is a fluid-filled vibration damping device, includes: a main rubber elastic body; an inner shaft member; an intermediate cylindrical member, wherein the inner shaft member and the intermediate cylindrical member are linked by the main rubber elastic body; an outer cylindrical member, externally inserted and fixed to the intermediate cylindrical member; multiple fluid chambers, separated in a circumferential direction, formed by covering pocket-like parts provided at the main rubber elastic body and open to an outer circumferential side of the intermediate cylindrical member by using the outer cylindrical member; and an orifice path allowing the fluid chambers to communicate with each other. A magnetic functional fluid is filled into the fluid chambers. A magnetic field generation unit applying a magnetic field to the magnetic functional fluid flowing through the orifice path is provided outside the fluid chambers. The outer cylindrical member is formed by a non-magnetic material. The intermediate cylindrical member is formed by a ferromagnetic material. In the intermediate cylindrical member, a magnetic field acting opening part is provided at a position corresponding to the orifice path in which the magnetic field is applied to the magnetic functional fluid.

Figure 1:
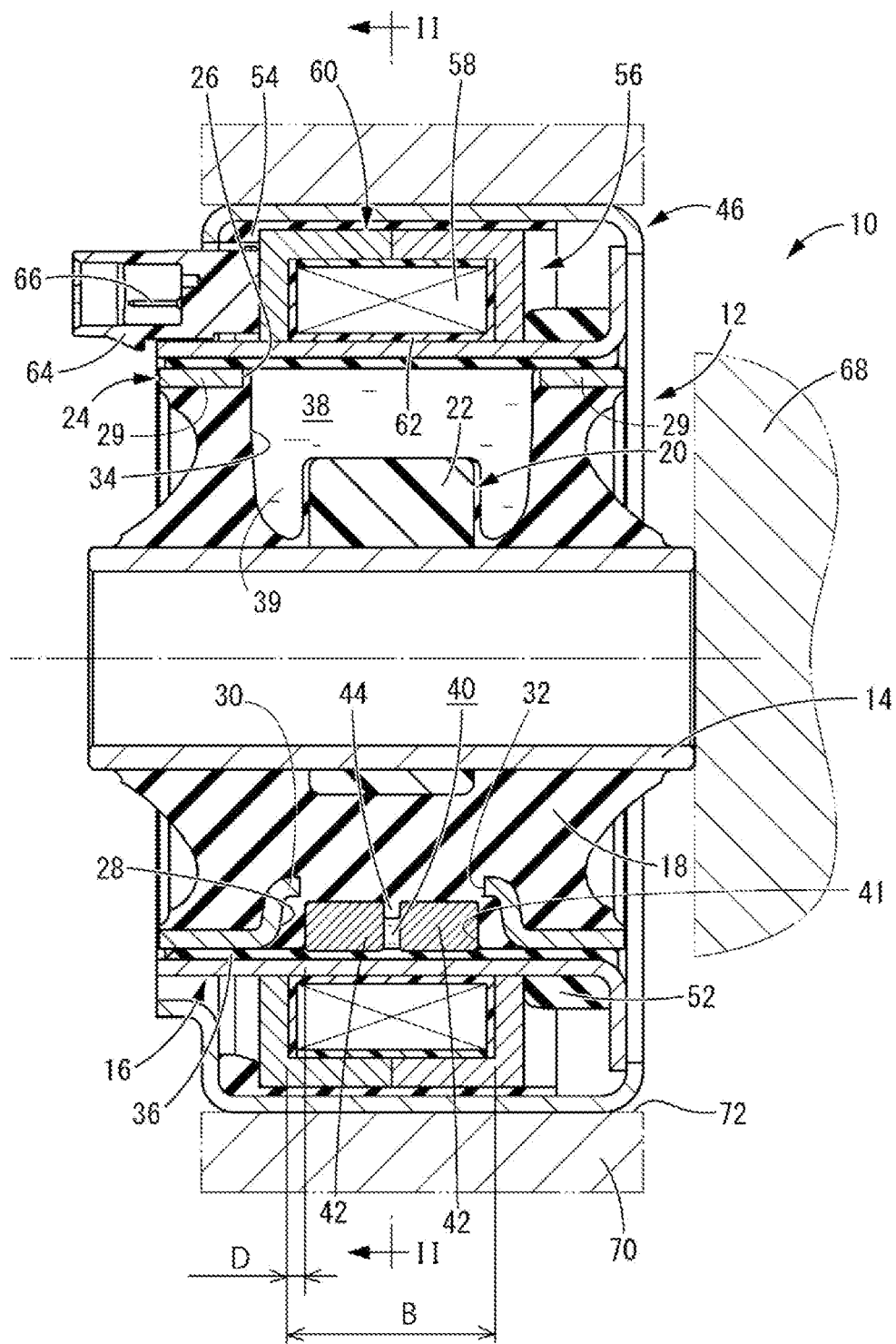
FIG. 1 is a cross-sectional view illustrating an engine mount as a first embodiment of the disclosure, and is equivalent to an I-I cross-section of FIG. 2.
Figure 4:
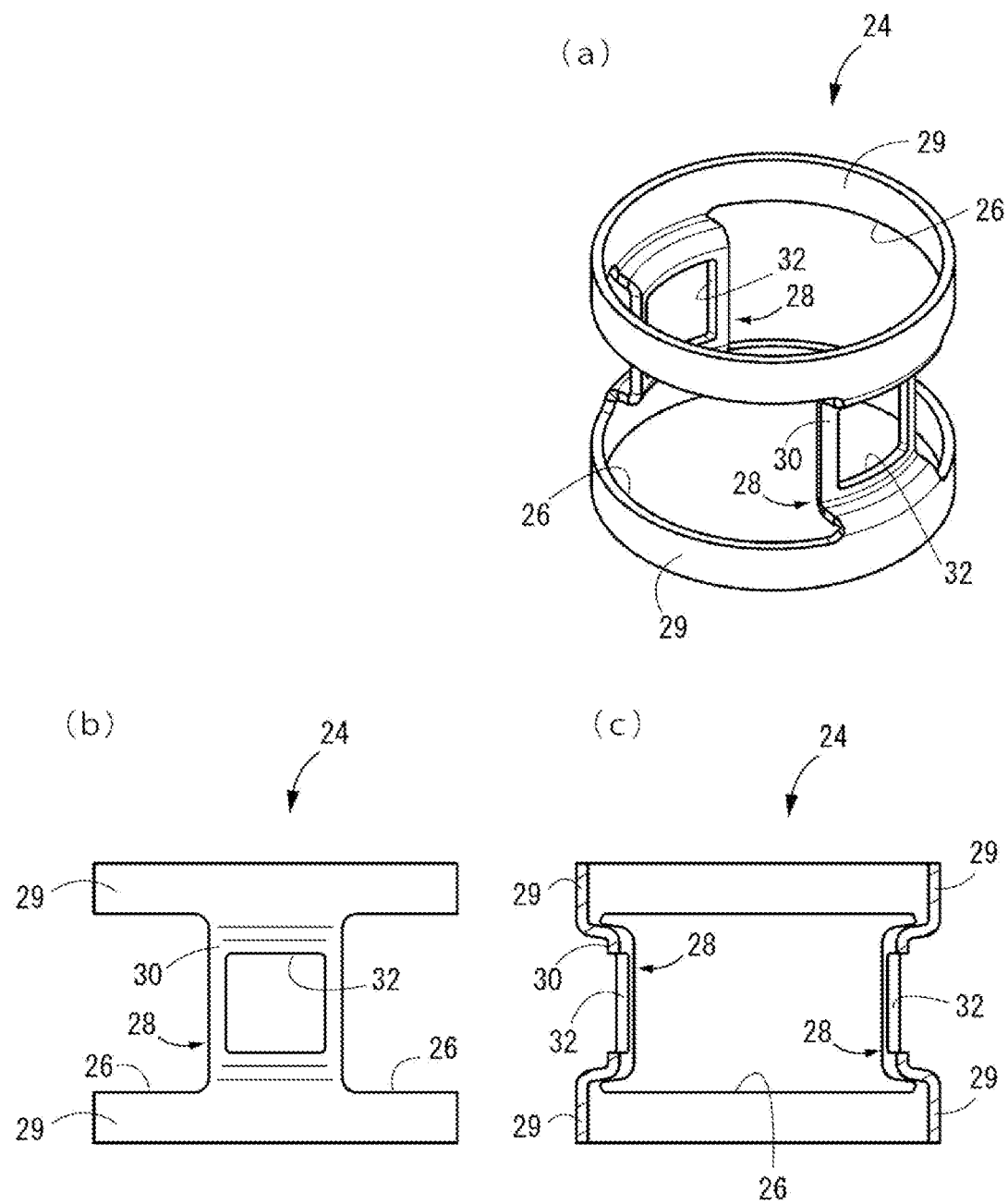

(a) of FIG. 4 is a perspective view illustrating an intermediate sleeve forming the engine mount shown in FIG. 1, (b) of FIG. 4 is a front view illustrating the intermediate sleeve, and (c) of FIG. 4 is a longitudinal cross-sectional view illustrating the intermediate sleeve.

Figure 5:
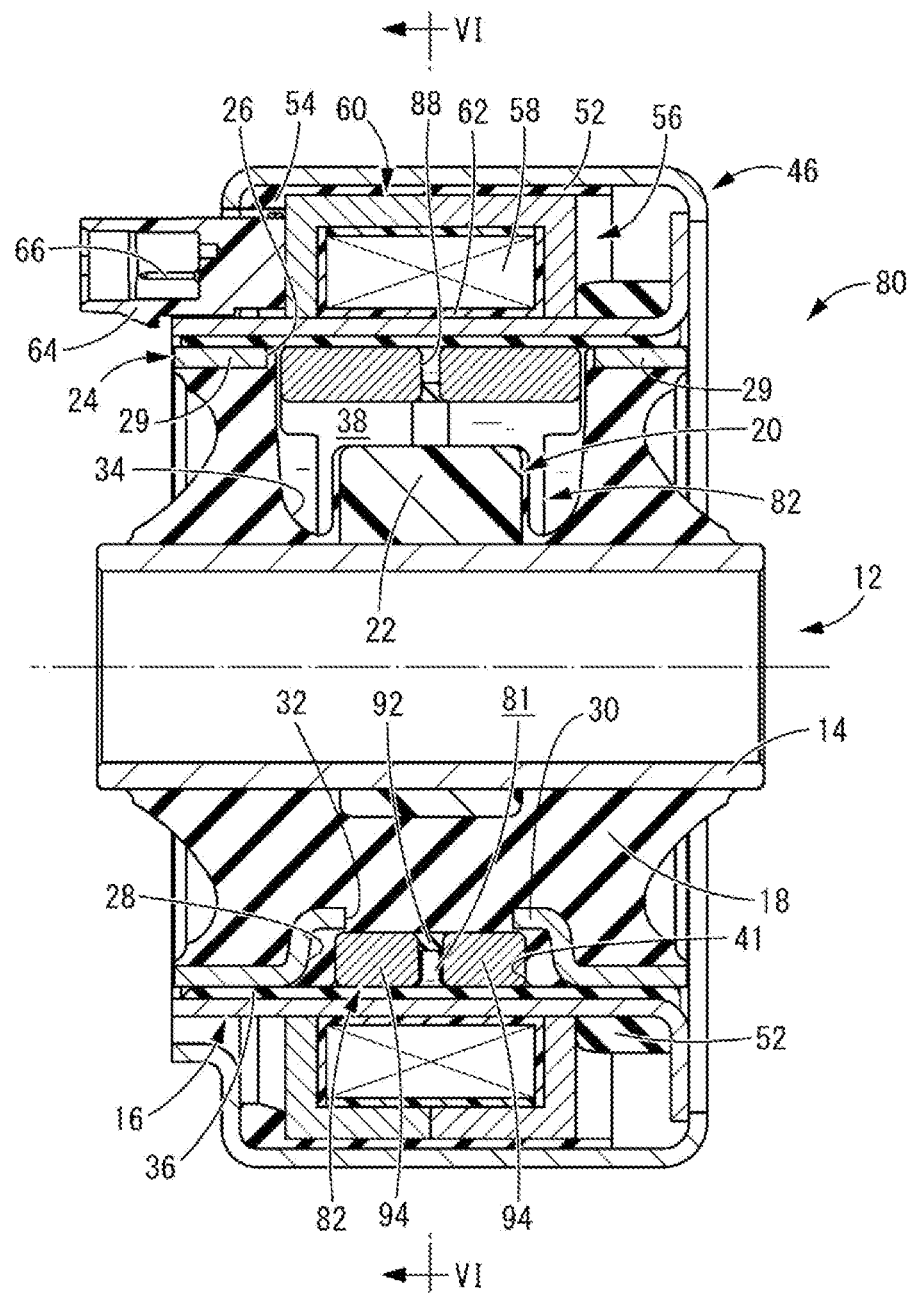
Figure 6:
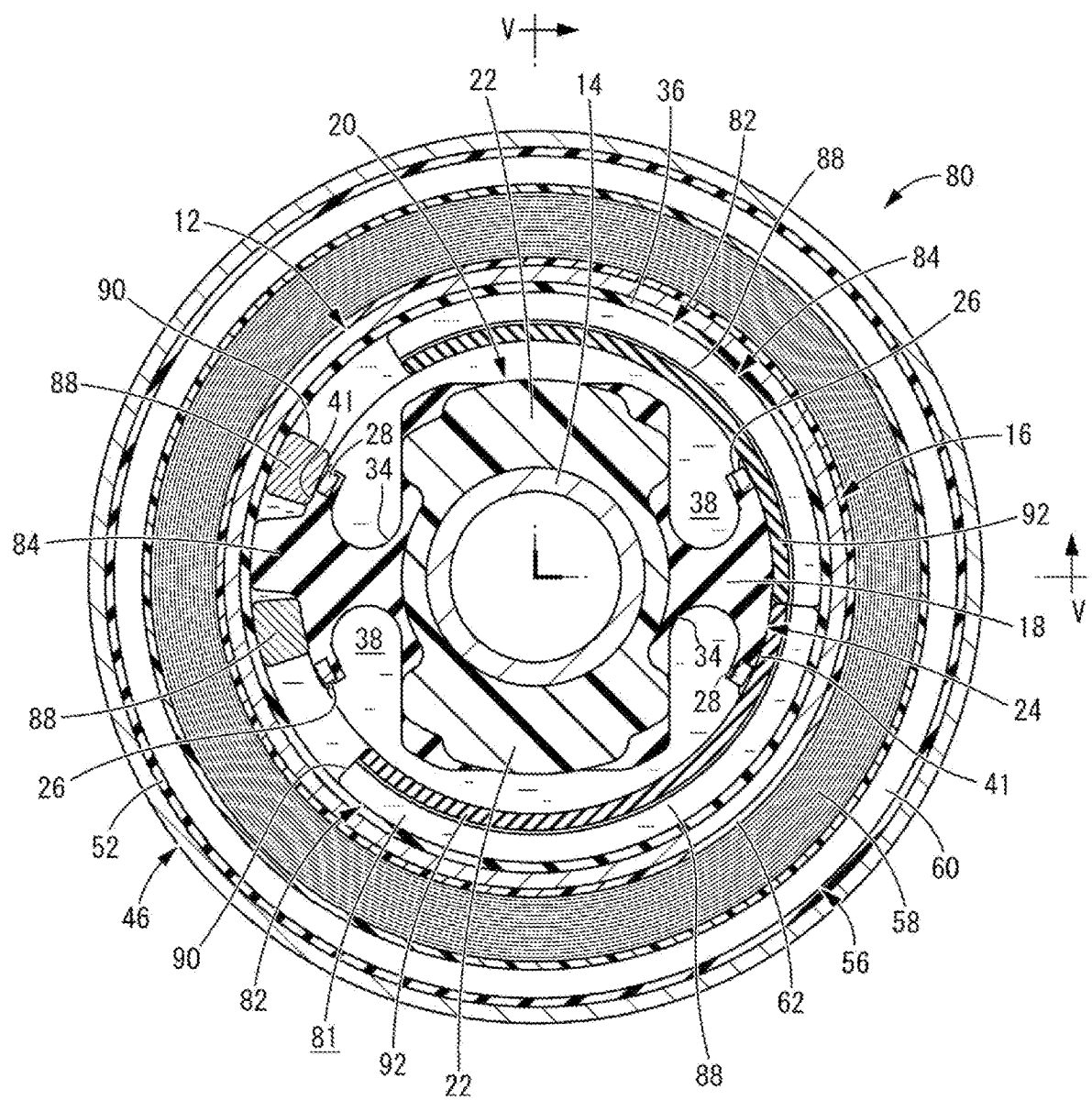

FIG. 5 is a cross-sectional view illustrating an engine mount as a second embodiment of the disclosure, and is equivalent to an IV-IV cross-section of FIG. 6.

FIG. 6 is a cross-sectional view of VI-VI of FIG. 5.

Figure 7:
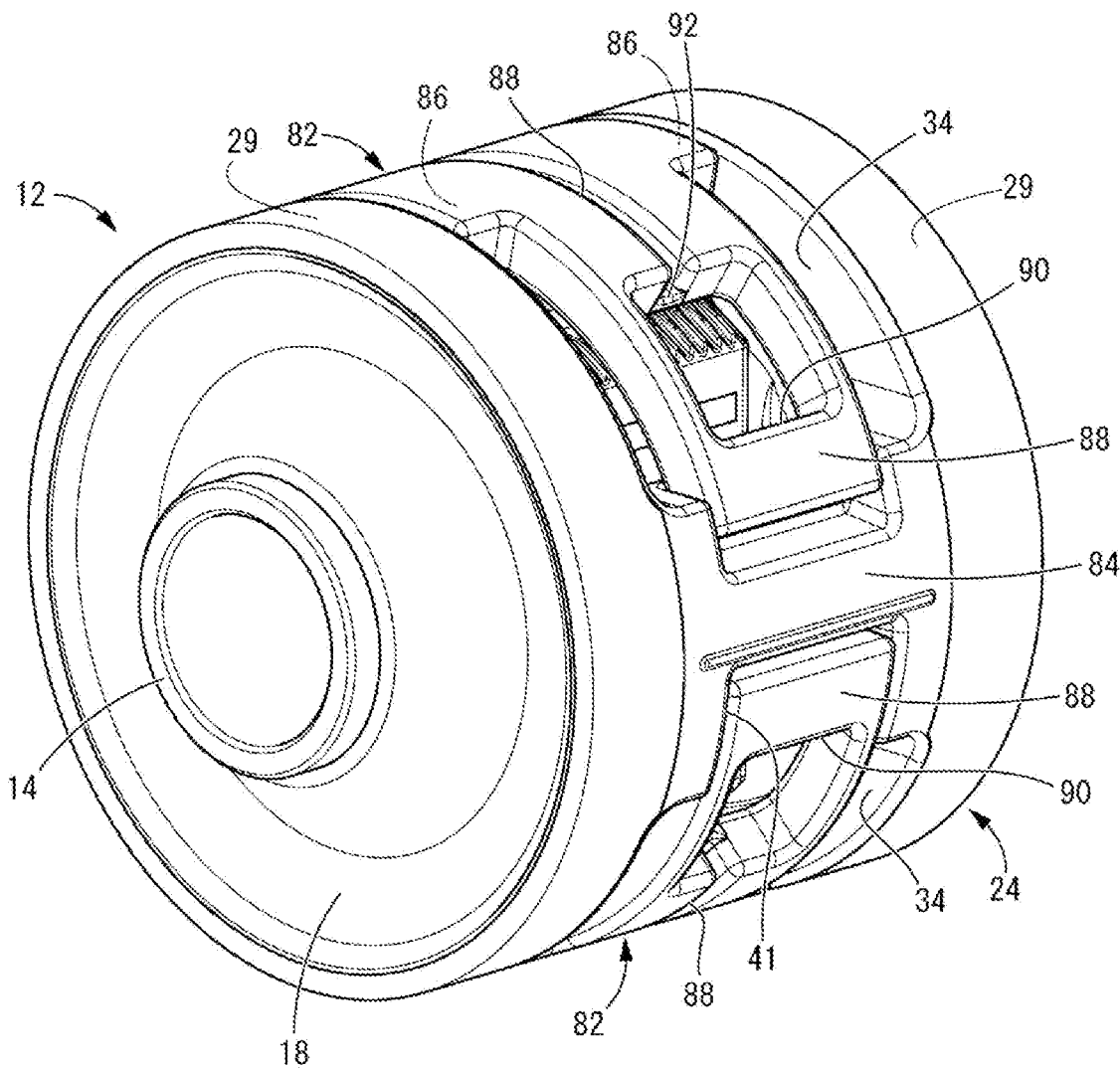

FIG. 7 is a perspective view in which an outer cylindrical member is removed in a mount body forming the engine mount shown in FIG. 5.

Figure 8:
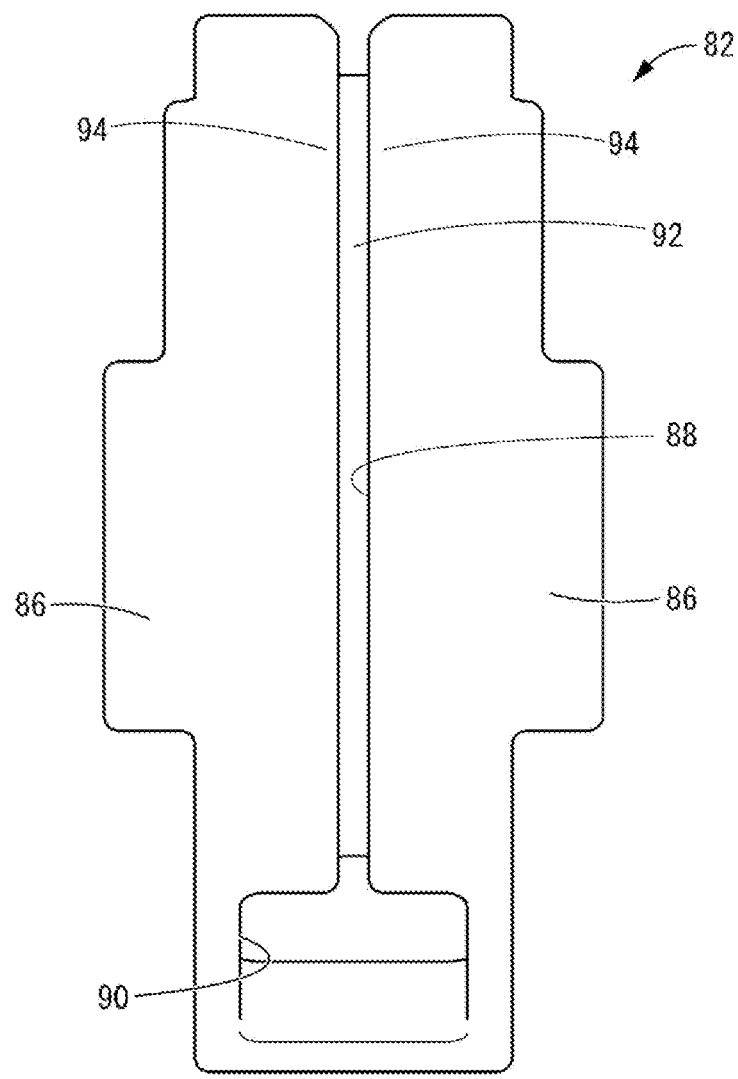

FIG. 8 is a plan view of an orifice member forming the engine mount of FIG. 5.

Figure 9:
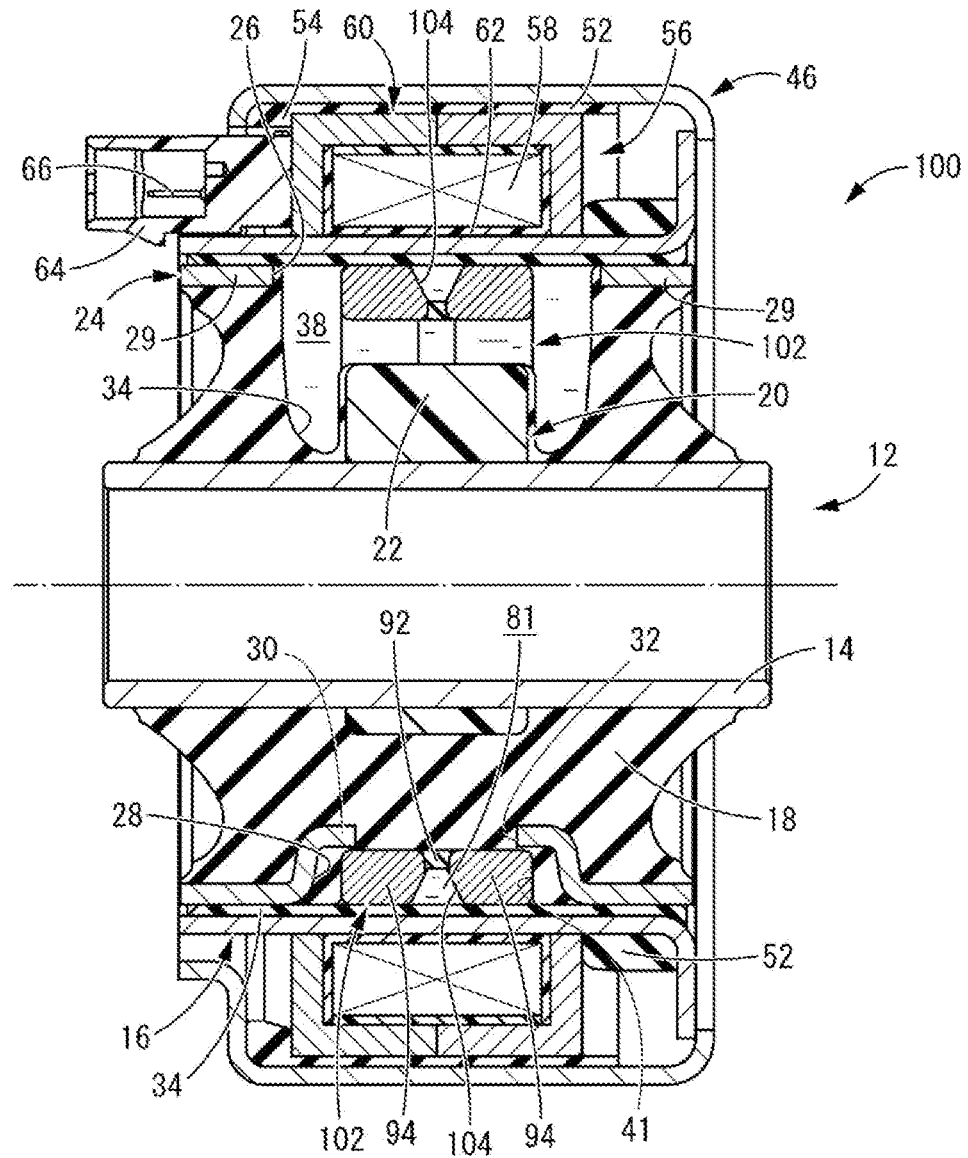

FIG. 9 is a cross-sectional view illustrating an engine mount as a third embodiment of the disclosure.

Figure 10:
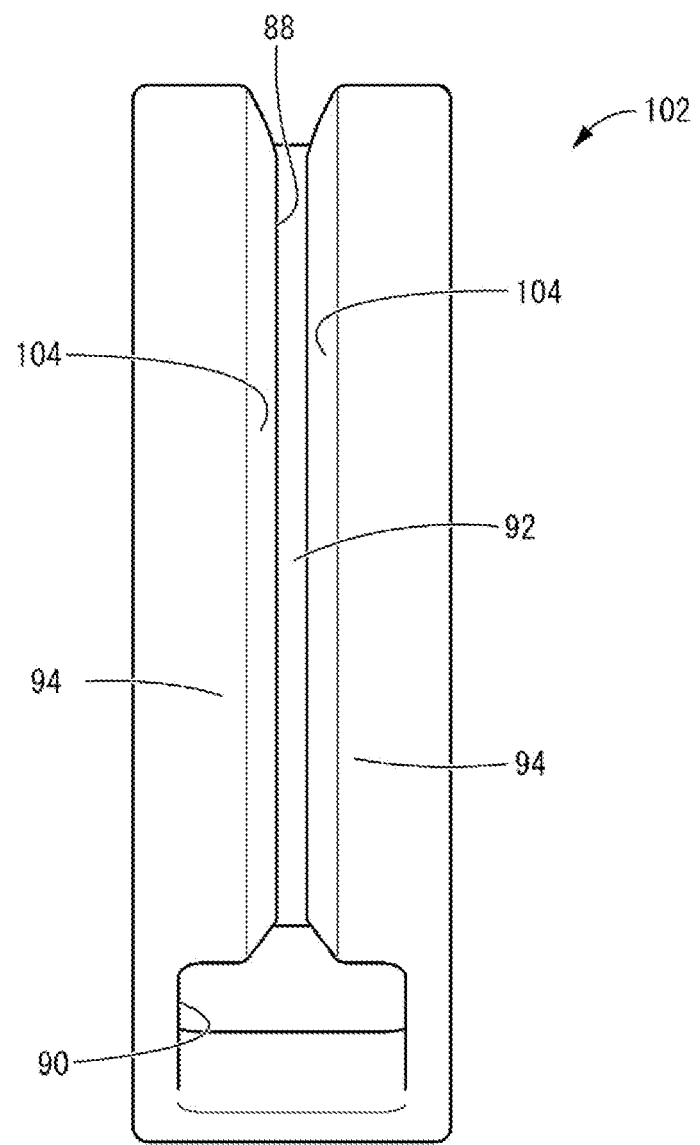

FIG. 10 is a plan view of an orifice member forming the engine mount of FIG. 9.

Figure 11:
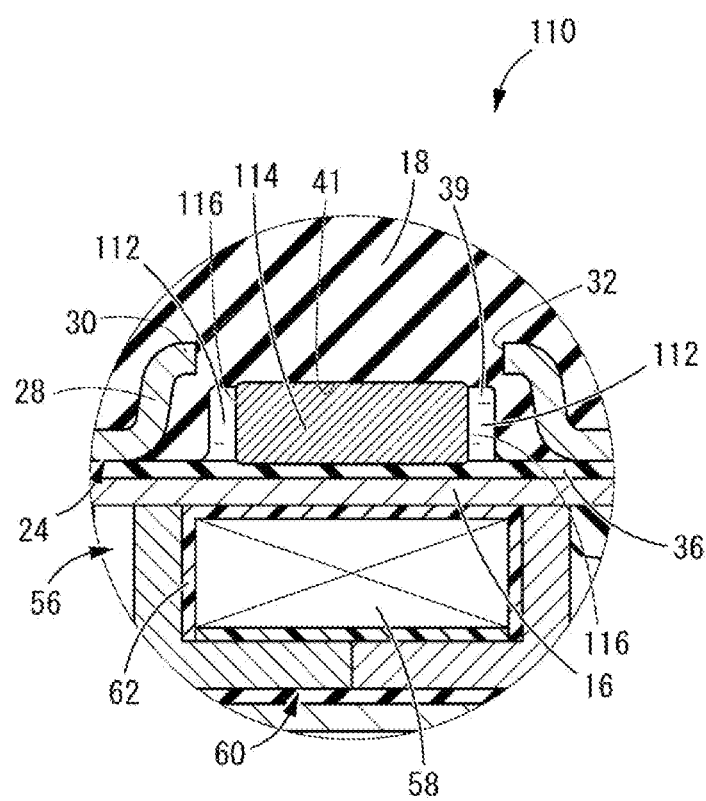

FIG. 11 is a cross-sectional view illustrating a portion of an engine mount as a fourth embodiment of the disclosure.

Figure 12:
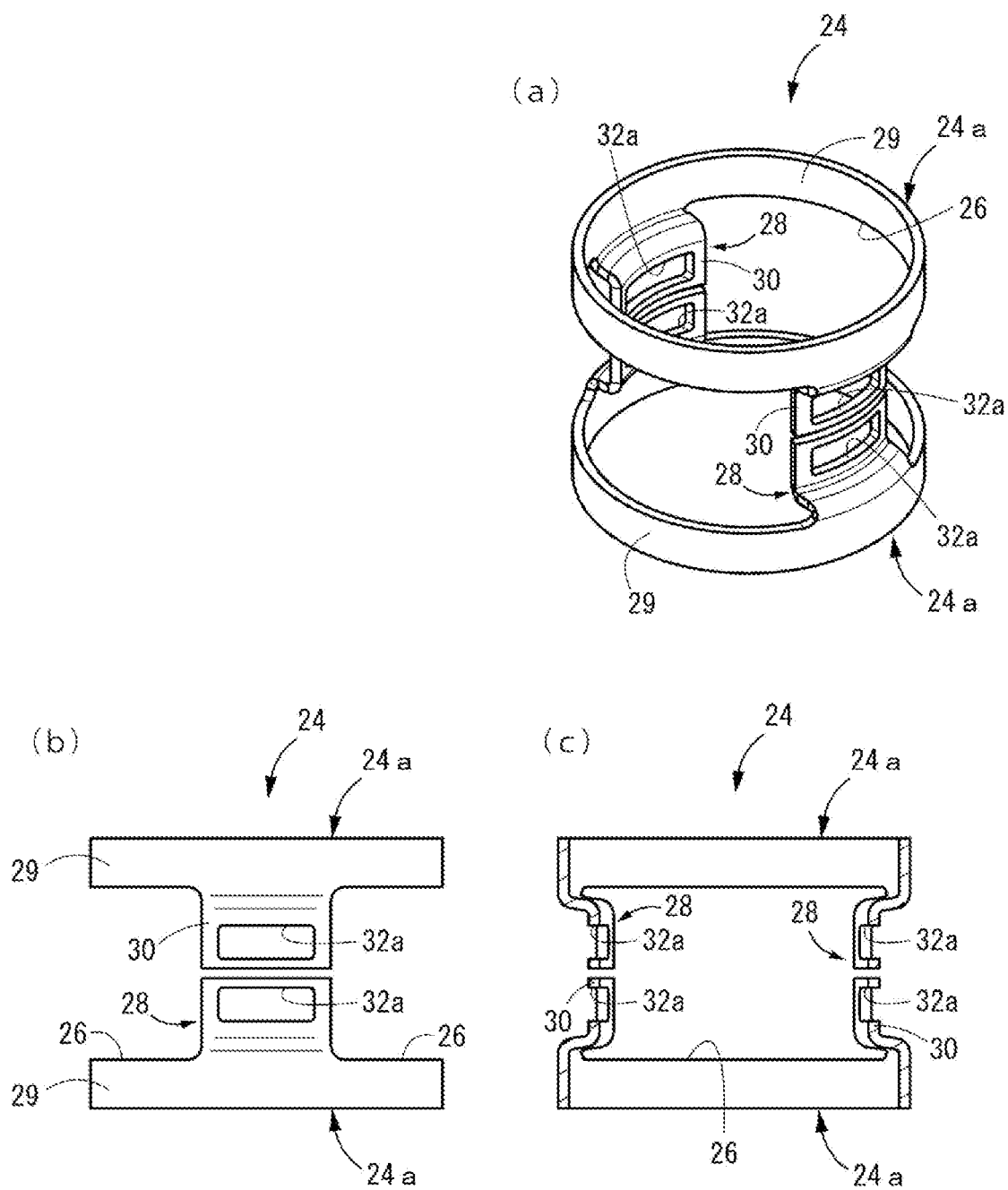

(a) of FIG. 12 is a perspective view illustrating another aspect of an intermediate sleeve that can be adopted in Embodiments 1 to 4 of the disclosure, (b) of FIG. 12 is a front view of the intermediate sleeve, and (c) of FIG. 12 is a longitudinal cross-sectional view of the intermediate sleeve.

Figure 13:
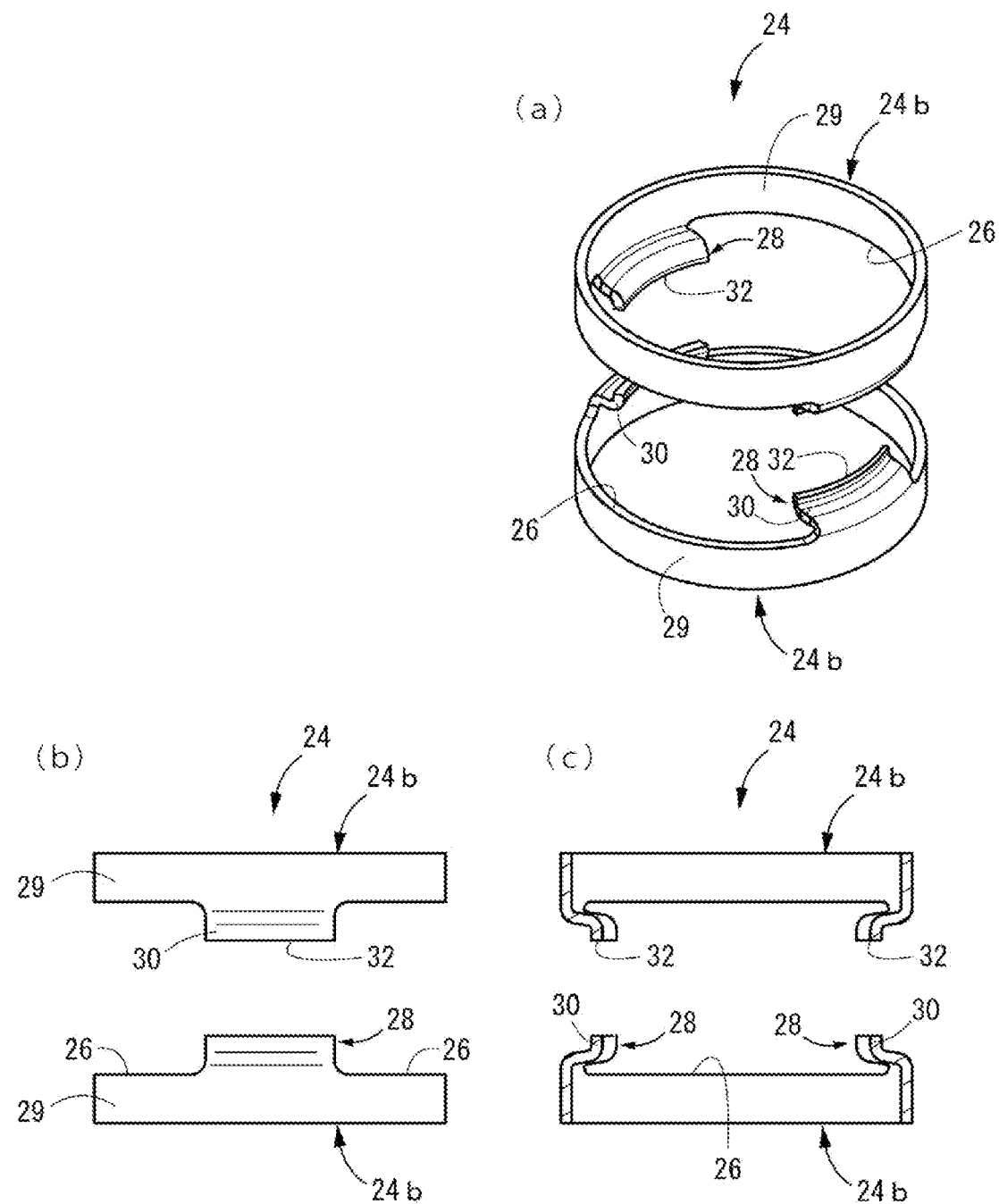

(a) of FIG. 13 is a perspective view illustrating yet another aspect of an intermediate sleeve that can be adopted in Embodiments 1 to 4 of the disclosure, (b) of FIG. 13 is a front view of the intermediate sleeve, and (c) of FIG. 13 is a longitudinal cross-sectional view of the intermediate sleeve.

Figure 14:
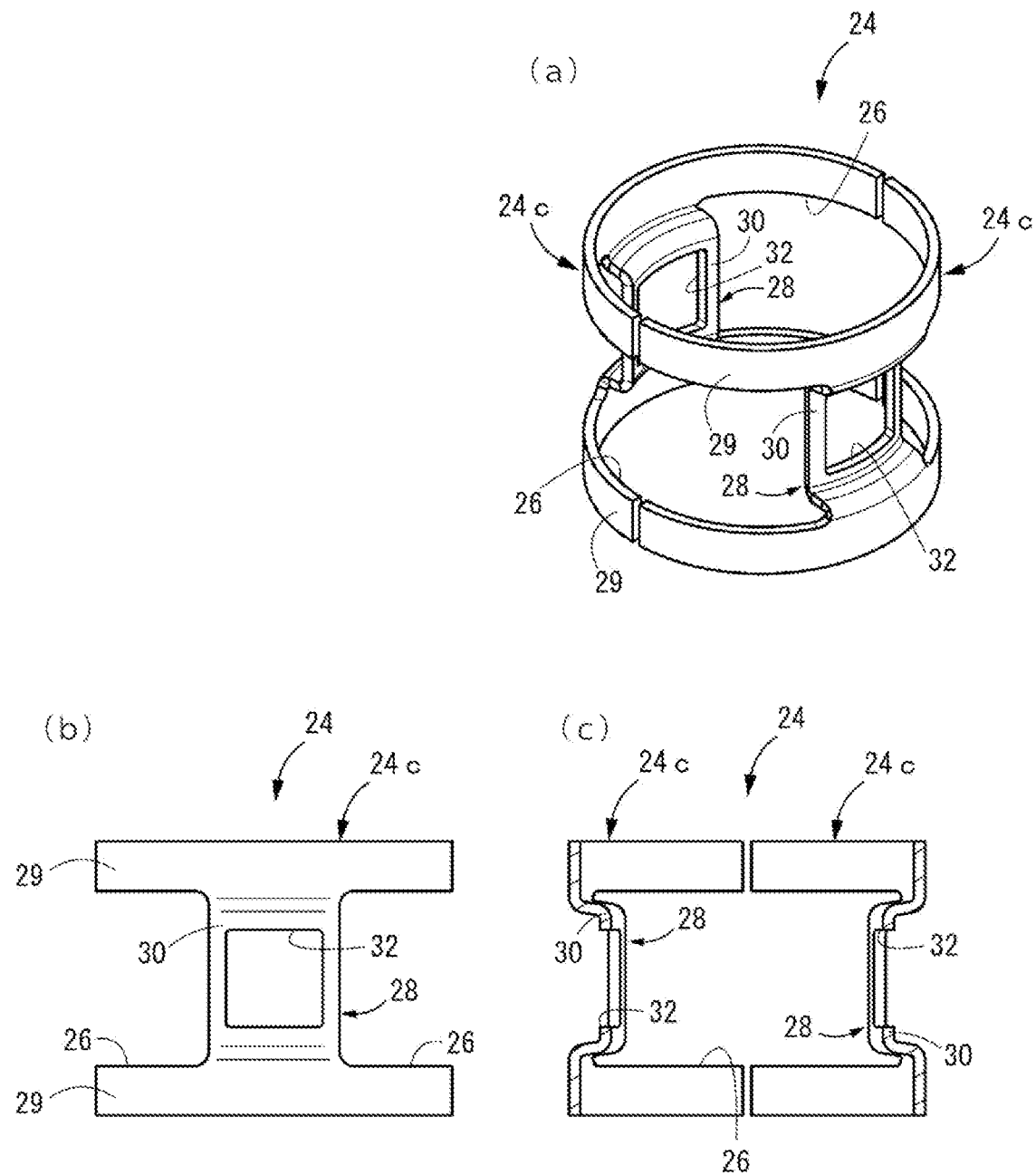

(a) of FIG. 14 is a perspective view illustrating yet another aspect of an intermediate sleeve that can be adopted in Embodiments 1 to 4 of the disclosure, (b) of FIG. 13 is a front view of the intermediate sleeve, and (c) of FIG. 13 is a longitudinal cross-sectional view of the intermediate sleeve.

DESCRIPTION OF THE EMBODIMENTS

The disclosure provides a vibration damping device with a novel configuration with which the magnetic field from the magnetic field generation unit can function efficiently with respect to the magneto-rheological fluid filled in the fluid chamber, and the vibration damping properties can be switched with favorable energy efficiency.

Hereinafter, exemplary embodiments for understanding the disclosure will be described, but each embodiment described below is described as an exemplary example, and may be used in combination with each other as appropriate. Multiple components described in each aspect can also be recognized and adopted independently as much as possible, and can also be adopted in combination with any component described in another aspect as appropriate. Accordingly, the disclosure can be implemented in various alternatives without being limited to the embodiments described below.

A first aspect of the disclosure is as follows. A vibration damping device, which is a fluid-filled vibration damping device, includes: a main rubber elastic body; an inner shaft member; an intermediate cylindrical member, wherein the inner shaft member and the intermediate cylindrical member are linked by the main rubber elastic body; an outer cylindrical member, externally inserted and fixed to the intermediate cylindrical member; multiple fluid chambers, separated in a circumferential direction, formed by covering pocket-like parts provided at the main rubber elastic body and open to an outer circumferential side of the intermediate cylindrical member by using the outer cylindrical member; and an orifice path allowing the fluid chambers to communicate with each other. A magnetic functional fluid is filled into the fluid chambers. A magnetic field generation unit applying a magnetic field to the magnetic functional fluid flowing through the orifice path is provided outside the fluid chambers. The outer cylindrical member is formed by a non-magnetic material. The intermediate cylindrical member is formed by a ferromagnetic material. In the intermediate cylindrical member, a magnetic field acting opening part is provided at a position corresponding to the orifice path in which the magnetic field is applied to the magnetic functional fluid.

In the vibration damping device according to the aspect, the fluid filled into the fluid chambers is a magnetic functional fluid whose rheological degree changes with the magnetic field applied from the magnetic field generation unit. Therefore, by controlling the magnetic field applied from the magnetic field generation unit in accordance with an input vibration, for example, to change the properties of the vibration damping device, favorable vibration damping properties can be obtained.

Specifically, in the vibration damping device of the aspect, the outer cylindrical member arranged to cover the outer circumference of the fluid chamber is configured to be a non-magnetic material. Therefore, the magnetic field from the magnetic field generation unit can be prevented from being shielded or reduced by the outer cylindrical member, and the magnetic field from the magnetic field generation unit can be effectively applied to the magnetic functional fluid.

Moreover, in the vibration damping device of the aspect, the intermediate cylindrical member formed by a ferromagnetic material is adopted, and the magnetic field acting opening part is provided at a position corresponding to the orifice path in the intermediate cylindrical member. Therefore, the magnetic field from the magnetic field generation unit can be efficiently guided to the orifice path through the intermediate cylindrical member. That is, for example, the magnetic field from the magnetic field generation unit is efficiently guided to the vicinity of the orifice path through the intermediate cylindrical member, and the magnetic field so guided can act toward the orifice path from the intermediate cylindrical member through the magnetic field acting opening part. In addition, in the case where a magnetic flux concentration member, etc., to be described afterwards is arranged to facilitate the concentration of the magnetic flux toward the forming portion of the orifice path, for example, as well, the concentrated magnetic flux can be prevented or suppressed from escaping through the intermediate cylindrical member by using the magnetic field acting opening part, thus making it also advantageous to concentrate the magnetic flux to the orifice path.

Accordingly, in the vibration damping device of the aspect, it is possible to adequately use the intermediate cylindrical member to fix the outer cylindrical member to the outer circumferential side of the main rubber elastic body and secure the liquid-tightness of the fluid chambers and allow the magnetic flux from the magnetic field generation unit to function efficiently on the magnetic functional fluid of the orifice path. As a result, a novel vibration damping device capable of switching the vibration damping properties with favorable energy efficiency can be realized.

According to a second aspect of the disclosure, in the vibration damping device of the first aspect, the intermediate cylindrical member includes: a pair of side portions in an axial direction, configured in a cylindrical shape with a large diameter that is continuous in the circumferential direction; and an intermediate portion in the axial direction, partially provided in the circumferential direction, and having a concave groove shape extending in the circumferential direction between the pair of side portions in the axial direction. The magnetic field acting opening part is provided at the intermediate portion in the axial direction.

In the vibration damping device of the aspect, the concave groove-shaped intermediate portion in the axial direction that is provided in the intermediate cylindrical member is used, and the orifice path can be formed in such concave groove-shaped internal space. The deformation of the orifice path due to deformation of the main rubber elastic body resulting from an input vibration, for example, can also be suppressed by the intermediate portion in the axial direction provided in the intermediate cylindrical member.

According to a third aspect of the disclosure, in the vibration damping device of the second aspect, the intermediate cylindrical member is a single component formed by the pair of side portions in the axial direction connected at the intermediate portion in the axial direction, and the magnetic field acting opening part is configured by a window part formed to penetrate through a groove bottom part in the intermediate portion in the axial direction that is configured as the concave groove shape.

In the vibration damping device of the aspect, the magnetic field acting opening part is provided in the intermediate cylindrical member, the entire intermediate cylindrical member can be a single component, and it is possible to manage the components or simplify the manufacture of the vibration damping device.

According to a fourth aspect of the disclosure, in the vibration damping device of the second aspect, the intermediate cylindrical member is configured in a split configuration on two sides in the axial direction in the intermediate portion in the axial direction, and the pair of side portions in the axial direction are separate components, and the magnetic field acting opening part is configured between split parts of the intermediate portion in the axial direction separated in the axial direction.

In the vibration damping device according to the aspect, since the intermediate cylindrical member is arranged as separate components to each other on the two sides in the axial direction by the magnetic field acting opening part, the intermediate cylindrical member is substantially divided in the axial direction in the circumference of the magnetic field acting part as well. Therefore, it is possible to suppress the magnetic flux acting on the orifice path from escaping due to the magnetic path being formed in a portion continuous on the circumference of the magnetic field acting opening part in the intermediate cylindrical member, for example.

According to a fifth aspect of the disclosure, in the vibration damping device of any one of the first to fourth aspects, the magnetic field generation unit is arranged on an outer circumferential side of the outer cylindrical member.

In the vibration damping device according to the aspect, regarding the space where the magnetic field generation unit is arranged, it is possible to avoid the influence on the fluid chamber or the main rubber elastic body, while performing a setting with a greater degree of freedom on the outer circumferential side of the outer cylindrical member. Specifically, in the aspect, by forming the outer cylindrical member with a non-magnetic material, it is possible to allow the magnetic field from the magnetic field generation unit arranged on the outer circumferential side of the outer cylindrical member to function efficiently through forming the orifice path to extend along the inner circumferential surface of the outer cylindrical member, for example.

According to a sixth aspect of the disclosure, in the vibration damping device of any one of the first to fifth aspects, in the orifice path, magnetic flux concentration members formed by a ferromagnetic material are disposed to be opposite to each other in a width direction of the orifice path, and the magnetic field acting opening part in the intermediate cylindrical member is provided at a position corresponding to a portion between opposite parts in the magnetic flux concentration members.

In the vibration damping device of the aspect, by arranging the magnetic flux concentration member at the forming portion of the orifice path, the magnetic flux acting on the orifice path is further concentrated.

According to a seventh aspect of the disclosure, in the vibration damping device of the sixth aspect, between the intermediate cylindrical member and the outer cylindrical member, an orifice member for forming the orifice path is arranged to extend, in the circumferential direction, along the pocket-like part provided in the main rubber elastic body, the orifice member is formed by a ferromagnetic material, and the magnetic flux concentration members disposed to be opposite to each other in the width direction of the orifice path are formed by the orifice member.

In the vibration damping device according to the aspect, with the orifice member extending to the opening part of the pocket-like part, a large design freedom degree regarding the length of the orifice path, etc., can be secured. In addition, it is possible to allow the magnetic flux to efficiently function on the magnetic functional fluid in the orifice path by using the orifice member.

According to an eighth aspect of the disclosure, in the vibration damping device of any one of the first to seventh aspects, the magnetic field generation unit includes: a coil member, generating a magnetic field by being supplied with power, and a yoke member, guiding a magnetic flux in the magnetic field generated by the coil member to the orifice path In the vibration damping device according to the aspect, it is possible to efficiently guide the magnetic flux from the magnetic field generation coil member to the magnetic functional fluid of the orifice path via the yoke member, and it is possible to easily control the magnetic flux density applied to the magnetic functional fluid by controlling the power supplied to the coil member as well as the vibration damping properties that are exhibited.

In addition, in the aspect, it is possible to use a portion or the entirety of the intermediate sleeve, for example, as the yoke member, and it is also possible to use the magnetic flux concentration member according to the sixth or seventh aspect as the yoke member, for example. Accordingly, such yoke member can be configured by using a fewer number of components or a simpler configuration.

According to the disclosure, in the vibration damping device whose vibration damping properties can be changed by controlling the magnetic field applied from the magnetic field generation unit provided outside the fluid chamber to the magneto-rheological fluid filled in the fluid chamber, the magnetic field from the magnetic field generation unit can function efficiently with respect to the magneto-rheological fluid filled in the fluid chamber. As a result, a vibration damping device with a novel configuration and capable of switching the vibration damping properties with favorable energy efficiency may be realized.

In the following, the embodiments of the disclosure are described with reference to the drawings.

Figure 2:
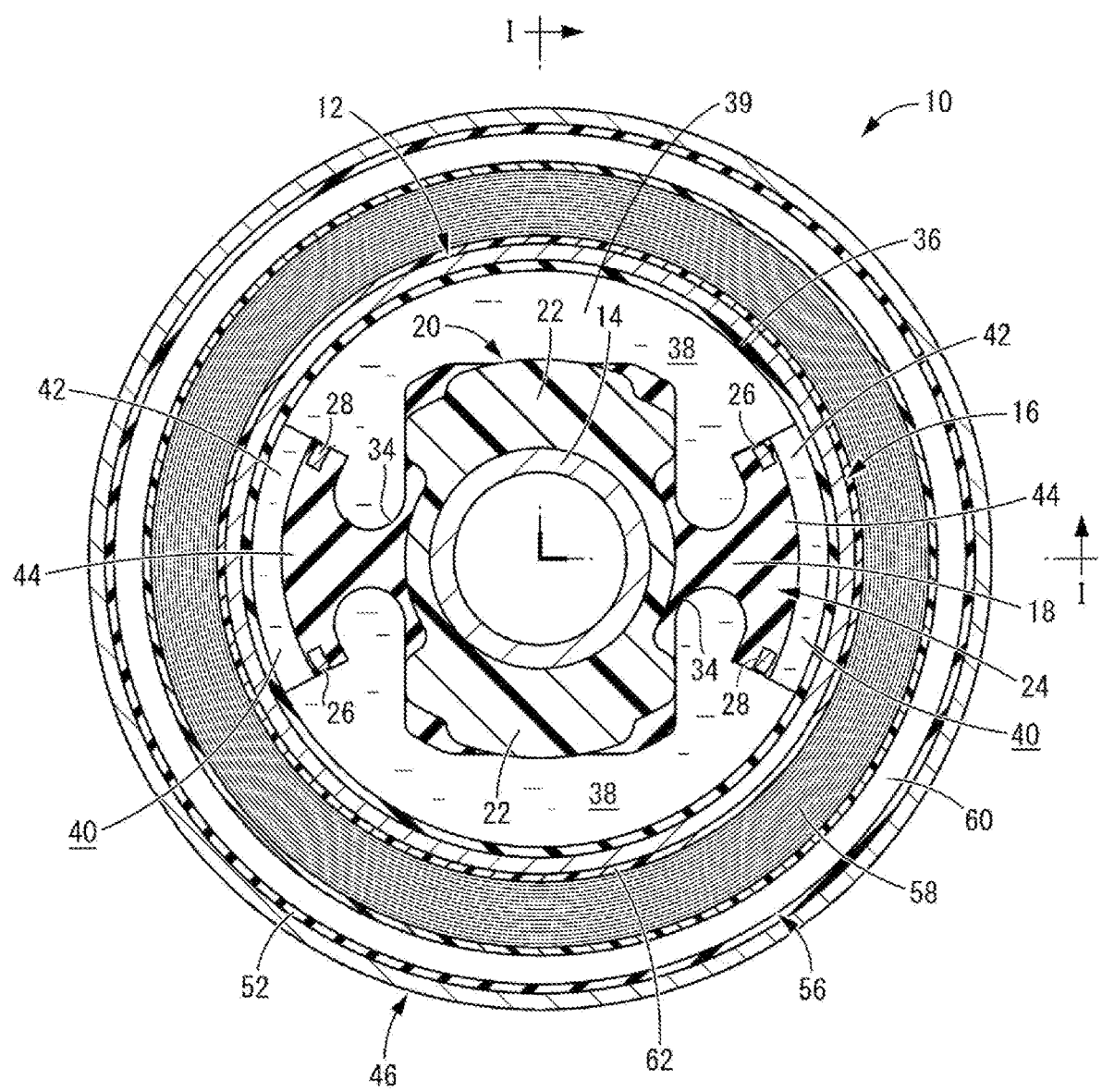
FIG. 2 is a cross-sectional view of II-II of FIG. 1.
Figure 3:
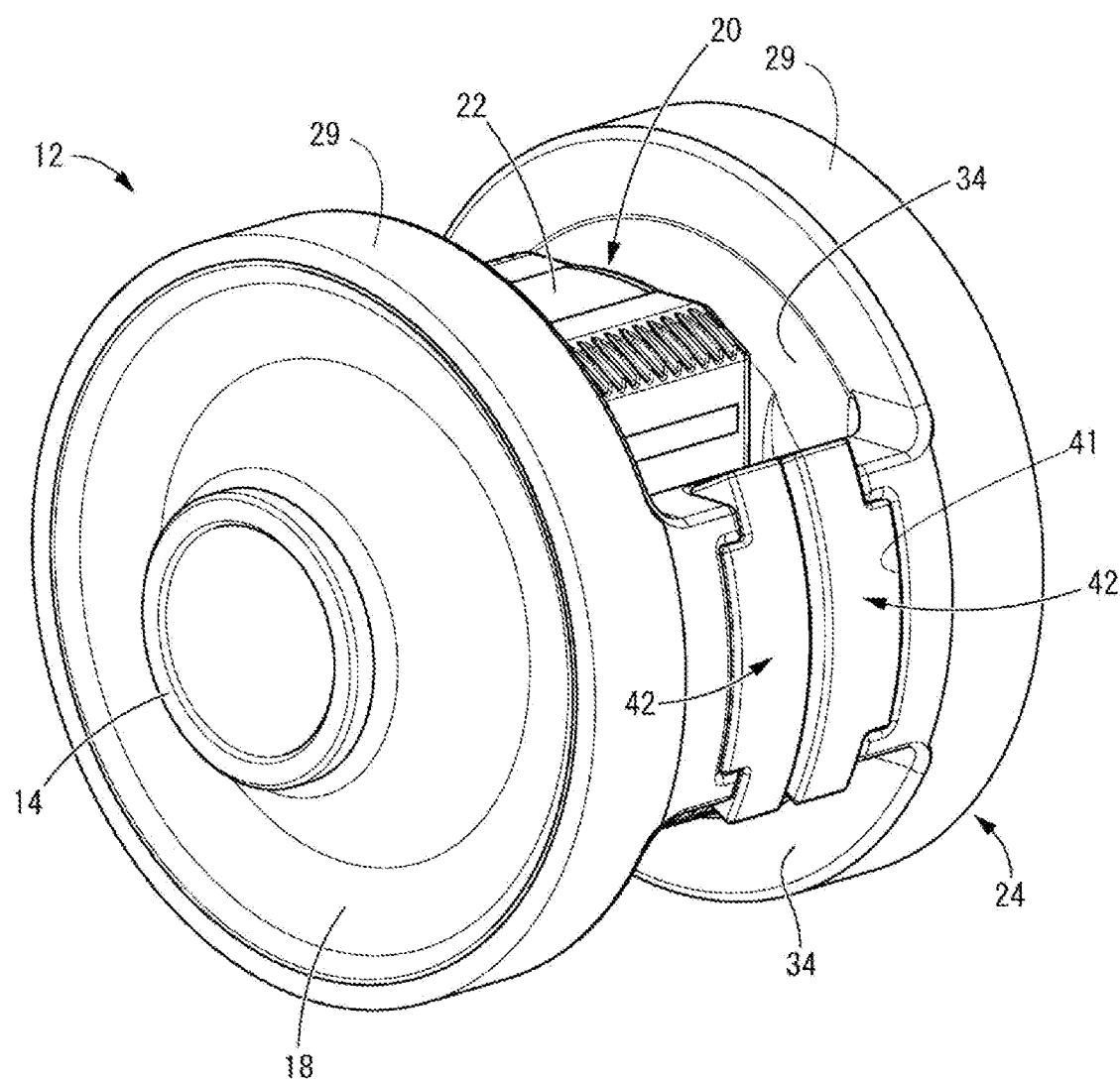
FIG. 3 is a perspective view in which an outer cylindrical member is removed in a mount body forming the engine mount shown in FIG. 1.

In FIGS. 1 to 2, as a first embodiment of a vibration damping device configured according to the disclosure, an engine mount 10 of an automotive is shown. The engine mount 10 is a fluid-filled vibration damping device, and has a mount body 12 with a configuration in which an inner shaft member 14 and an outer cylindrical member 16 are linked by a main rubber elastic body 18. In FIG. 3, a state in which the outer cylindrical member 16 is removed from the mount body 12 is shown. In the following descriptions, in principle, the axial direction refers to the left-right direction of FIG. 1, which is a mount central axis direction, and the upper-lower direction refers to the upper-lower direction of FIG. 2, which is a main vibration input direction.

The inner shaft member 14 is formed in a substantially cylindrical shape with a small diameter, and extends linearly in the axial direction. The material of the inner shaft member 14 is not particularly limited, and a ferromagnetic material such as an iron-based material can also be adopted. However, for example, in the case where there is a concern that the inner shaft member 14 may have an adverse influence on a magnetic field generated by a magnetic field generation unit (56) to be described afterwards, the inner shaft member 14 may also be formed by using a non-magnetic material such as stainless steel or an aluminum alloy.

A stopper member 20 is fixed to the central portion of the inner shaft member 14 in the axial direction. The stopper member 20, as a whole, is configured in a substantially annular shape, and is fixed to the inner shaft member 14 in an externally inserted state. As shown in FIG. 2, such inner shaft member 14 includes two protrusion parts 22, 22 protruding toward the sides in the upper-lower direction. Although the stopper member 20 is not necessarily required, in the case where the stopper member 20 is adopted, if the stopper member 20 has an adverse effect on the magnetic field generated by the magnetic field generation unit (56) to be described afterwards, the stopper member may be formed by using a non-magnetic material such as synthetic resin, a rubber elastic body, or an aluminum alloy, etc.

In addition, an intermediate sleeve 24, as an intermediate cylindrical member, is arranged on the circumference of the inner shaft member 14. The intermediate sleeve 24, as shown in the single component views in (a) to (c) of FIG. 4, is formed in a substantially cylindrical shape with a diameter greater than the inner shaft member 14, and is disposed in an externally inserted state and separated from the inner shaft member 14 in the radial direction. The inner shaft member 14 and the intermediate sleeve 24 (and the cylindrical member 16) may also be eccentric in the radial direction, but these components are arranged on substantially the same central axis in the embodiment.

The intermediate sleeve 24 is formed by a ferromagnetic material. For example, an iron-based metal may be adopted as appropriate. Compared with the case where a non-magnetic material such as an aluminum alloy is adopted, for example, the strength properties of the intermediate sleeve 24 are secured, while the manufacturing cost is reduced, and the processing is simplified.

The intermediate sleeve 24 includes window parts 26, 26 at two places in the circumferential direction. In the embodiment, a pair of window parts 26, 26 are located at opposite positions in the upper-lower direction (the upper-lower direction of FIG. 1). Each window part 26 penetrates through the inside and the outside of the intermediate sleeve 24 in the thickness direction at the central portion of the intermediate sleeve 24 in the axial direction, and is in a substantially rectangular shape wide in the circumferential direction and having a predetermined width in the axial direction.

Between the two window parts 26, 26 of the intermediate sleeve 24 in the axial direction, groove-like parts 28 respectively extending in the circumferential direction are provided and located at opposite positions in the left-right direction of FIG. 2. Each groove-like part 28 is a portion configured with a small diameter in the intermediate portion of the intermediate sleeve 24 in the axial direction and in a concave groove shape open to the outer circumferential surface. The groove-like part 28 extends in the circumferential direction of the intermediate sleeve 24. The two ends of the groove-like part 28 in the circumferential direction respectively reach the two window parts 26, 26.

In brief, the intermediate sleeve 24 has a pair of side portions 29, 29 in the axial direction that are continuous in the circumferential direction and arranged in a cylindrical shape with a large diameter, and an intermediate portion in the axial direction is integrally provided with the groove-like parts 28, 28 partially provided in the circumferential direction, and, in the circumferential direction, extending between and linking the pair of axial direction side portions 29, 29.

In addition, in the intermediate sleeve 24, on a bottom wall portion 30 of each groove-like part 28 forming the intermediate portion in the axial direction, a magnetic field acting opening part 32 is formed in the form of a through hole penetrating through the inside and the outside. In the embodiment, the magnetic field acting opening part 32 is formed in a substantially rectangular shape at the central portion of the bottom wall portion 30, so that the bottom wall portion 30 of each groove-like part 28 remains in a shape of a surrounding rectangular frame.

In addition, the inner shaft member 14 and the intermediate sleeve 24 are linked by the main rubber elastic body 18. The main rubber elastic body 18 is in a thick, substantially cylindrical shape, the inner circumferential portion of the main rubber elastic body 18 is fixed to the inner shaft member 14, and the outer circumferential portion of the main rubber elastic body 18 is fixed to the intermediate sleeve 24. In addition, the main rubber elastic body 18 extends into the groove inner surface of the groove-like part 28 through the magnetic field acting opening part 32, etc., of the intermediate sleeve 24, and is also fixed to the outer circumferential surface of the intermediate sleeve 24 in the groove-like part 28. In this way, the main rubber elastic body 18 is formed as an integrally vulcanized molded article including the inner shaft member 14 and the intermediate sleeve 24.

In addition, as shown in FIG. 2, the main rubber elastic body 18 includes two pocket-like parts 34, 34. The pocket-like parts 34, 34 are each configured like a depression or a recess open to the outer circumferential surface of the main rubber elastic body 18, and is open toward each direction in the upper-lower direction in the embodiment. The pair of pocket-like parts 34, 34 are provided at positions corresponding to the pair of window parts 26, 26 of the intermediate sleeve 24, opening perimeter parts of the pocket-like parts 34, 34 are fixed to the opening frame parts of the window parts 26, 26, and each pocket-like part 34 is open toward the outer circumferential side through each window part 26. In addition, the protrusion parts 22, 22 of the stopper member 20 protrude in a medium height in the depth direction of the pocket-like parts 34, 34 at substantially the centers of the respective bottom parts of the pocket-like parts 34, 34.

In addition, the outer cylindrical member 16 is externally inserted to the integrally vulcanized molded article of the main rubber elastic body 18, and such outer cylindrical member 16 is externally fit and fixed to the intermediate sleeve 24 to be assembled. The outer cylindrical member 16 is configured in a substantially cylindrical shape with a diameter greater than the inner shaft member 14. The outer cylindrical member 16 is formed by a non-magnetic material, such as being formed by stainless steel or aluminum alloy.

In the embodiment, the inner circumferential surface of the outer cylindrical member 16 is entirely covered by a seal rubber layer 36 with a thin thickness. In addition, the outer cylindrical member 16 is fit and fixed to the intermediate sleeve 24 by performing a diameter reduction process such as eight-way squeezing, etc. In addition, with the seal rubber layer 36 being sandwiched therebetween, the outer cylindrical member 16 and the intermediate sleeve 24 are filled in a fluid-tight manner.

Accordingly, the mount body 12 is configured by fitting the outer cylindrical member 16 to the outer circumferential surface of the integrally vulcanized molded article of the main rubber elastic body 18 including the inner shaft member 14 and the intermediate sleeve 24, and a fluid filled region partitioned in a fluid-right manner with respect to the external space is formed inside such mount body 12.

Such fluid filled region includes two fluid chambers 38, 38 formed by covering the pair of pocket-like parts 34, 34 of the main rubber elastic body 18 by using the outer cylindrical member 16. The fluid chambers 38, 38 are separated from each other in the circumferential direction. In the embodiment, the pair of fluid chambers 38, 38 are disposed on two sides in the upper-lower direction by sandwiching the inner shaft member 14.

The partition wall between the two fluid chambers 38, 38 in the circumferential direction and the wall parts on the two sides of each partition chamber 38 in the axial direction are all formed by the main rubber elastic body 18. In addition, at the time when a vibration in the upper-lower direction in FIG. 1 is input, together with the relative displacement of the inner shaft member 14 and the outer cylindrical member 16 in a right angle direction to elastically deform the main rubber elastic body 18, a relative pressure change between the two fluid chambers 38, 38 is caused. In addition, in each fluid chamber 38, the protrusion part 22 of the stopper member 20 protrudes from the inner side toward the outer side in the radial direction, and the tip surface of the protrusion part 22 faces the outer cylindrical member 16 with a predetermined distance therebetween. In addition, with a contact between each protrusion part 22 and the outer cylindrical member 16, a stopper mechanism limiting the elastic deformation amount of the main rubber elastic body 18 at the time when the vibration is input is formed.

A magnetic functional fluid 39 is filled into the fluid filled region including the pair of fluid chambers 38, 38. The magnetic functional fluid 39 may be a fluid whose rheological degree is changed through the acting of a magnetic field. The magnetic functional liquid 39, for example, may be any of a magneto-rheological fluid (MRF), a magnetic fluid (MF), a magnetic composite fluid (MCF) mixing MRF and MF. As the magnetic functional fluid 39, a fluid whose rheological degree changes significantly with respect to the change of the magnetic flux density of an acting magnetic field may be adopted, and an MCF whose size of increase in the rheological degree can be easily adjusted according to the mixing ratio between MRF and MF may also be adopted.

The magnetic functional fluid 39, for example, is a suspension or a colloidal solution in which ferromagnetic fine particles are dispersed in a base liquid such as water, oil, etc., and one in which the surfaces of the ferromagnetic fine particles are coated with a surfactant so that it is difficult for the ferromagnetic fine particles to aggregate or to deposit in the base liquid, may be adopted. Alternatively, the aggregation, etc., may also be avoided or alleviated by dispersing the ferromagnetic fine particles in a base liquid with addition of a surfactant.

The ferromagnetic fine particles are, for example, metal particles of iron, ferrite, magnetite, etc., and the particle diameter may range, for example, between about 8 nm and about 10 µm. The base liquid is not particularly limited, as long as the ferromagnetic fine particles can be dispersed. For example, water, isoparaffin, alkylnaphthalene, perfluoropolyether, polyolefin, silicone oil, etc., may be adopted. In addition, the base liquid may be a non-compressible fluid. The surfactant may be selected as appropriate in accordance with the base liquid, for example, oleic acid, etc., may be adopted as appropriate. MRF and MF mainly differ in the particle diameter of the ferromagnetic fine particles. The particle diameter of the ferromagnetic fine particles in MRF is greater than that of MF.

Specifically, the above description relating to the magnetic functional fluid provides several examples of the magnetic functional fluid 39, and, as noted above, the magnetic functional fluid that can be adopted in the invention should not be interpreted as being limited by such description.

The fluid chambers 38, 38 in which such magnetic functional fluid 39 is filled are in communication with each other through orifice paths 40, 40 forming the fluid filled region like the fluid chambers 38, 38. The respective orifice paths 40 extend in the circumferential direction from two ends of the respective fluid chambers 38, 38 in the circumferential direction, and the pair of fluid chambers 38, 38 are in communication with each other.

In the embodiment, in the pair of groove-like parts 28, 28 of the intermediate sleeve 24, an orifice groove 41 is formed in the main rubber elastic body filled into each groove-like part 28, and the orifice path 40 is formed by covering such orifice groove 41 by using the outer cylindrical member 16. The orifice groove 41 extends, in a substantially constant cross-sectional shape, throughout the entire length in the circumferential direction inside each groove-like part 28 of the intermediate sleeve 24.

In addition, a magnetic flux concentration member 42 formed by a ferromagnetic material such as iron is accommodated and disposed in each orifice groove 41. In the embodiment, a pair of magnetic flux concentration members 42 are incorporated to the ends on the two sides of the orifice groove 41 in the groove width direction (mount axial direction). The pair of magnetic flux concentration members 42, 42 extend in the circumferential direction in an arced shape with a substantially constant rectangular cross-section, and are positioned and fixed in the orifice groove 41 by fitting the pair of magnetic flux concentration members 42, 42 to the two sides of the orifice groove 41 in the groove width direction and pressing the outer circumferential surfaces thereof with the outer cylindrical member 16. As a result, the magnetic flux concentration members 42 and 42 are disposed in a filling state throughout the entire length on the two sides of the orifice groove 41 in the groove width direction, and the orifice path 40 allowing the fluid to flow between the pair of fluid chambers 38, 38 is formed between the opposite surfaces of the pair of magnetic flux concentration members 42, 42.

In the embodiment, a positioning protrusion 44 located at the center of the orifice groove 41 in the groove width direction, protruding from a groove bottom surface, and extending in the circumferential direction is formed by the main rubber elastic body extending into the groove of the intermediate sleeve 24 for the orifice groove 41. By fitting the positioning protrusion 44 between the opposite surfaces of the pair of magnetic flux concentration members 42, the dimensions of the opposite surfaces of the pair of magnetic flux concentration members 42, 42 as well as the flow path cross-sectional area of the orifice path 40 are set accurately and stably. The magnetic flux concentration members 42, 42 may also be linked to each other by using a non-magnetic material and positioned by being brought into contact with a rubber elastic body, and the positioning protrusion 44 is not necessarily required.

In addition, a cylindrical cover member 46 is installed to the mount body 12 in an externally inserted state, and a magnetic field generation unit housing is formed by the outer cylindrical member 16 and the cylindrical cover member 46. The cylindrical cover member 46 is configured in a substantially cylindrical shape with a diameter greater than the outer cylindrical member 16. The material of the cylindrical cover member 46 is not particularly limited, and a metal material with a high strength or a high rigidity may be adopted as appropriate.

In addition, the magnetic field generation unit 56 is assembled, in a state of being positioned by support elastic bodies 52, 54, between the outer cylindrical member 16 and the cylindrical cover member 46 positioned with respect to each other in the axial direction and the radial direction.

The magnetic field generation unit 56 as a whole is configured in a substantially ring shape, and has a configuration in which a yoke member 60 is assembled to the circumference of a coil 58. The coil 58 generates a magnetic field by being supplied with power, and a conventional component may be adopted as the coil 58. In general, the coil has a winding structure in which an electric wire with insulation coating is wound around a bobbin, and, where necessary, its entirety may be coated with an insulating resin. In the embodiment, a large-diameter, air-cored coil structure in which an electric wire is wound in the circumferential direction along the outer circumferential surface of the outer cylindrical member 16 may be adopted, for example. The two ends of the electric wire of such coil 58 are drawn out in the axial direction at a place on the circumference, and are conductive to a terminal part 66 of a connector 64, and an external electric control device not shown herein is electrically connected to the two ends of the coil 58 via the connector 64.

The yoke member 60 is formed by a ferromagnetic material, such as iron. The yoke member has a substantially C-shaped cross-section open toward the inner circumference, and is arranged to cover two end surfaces of the coil 58 in the axial direction and the outer circumferential surface of the coil 58. In addition, the open end surface of the yoke member 60 on the inner circumference side is assembled in a state of abutting against or being close to the outer circumferential surface of the outer cylindrical member 16. The two end surfaces of the yoke member 60 in the axial direction and the outer circumferential surface of the yoke member 60 are positioned and supported fixedly with respect to the magnetic field generation unit housing formed by the outer cylindrical member 16 and the cylindrical cover member 46 via the support elastic bodies 52, 54.

Accordingly, the magnetic flux generated by supplying power to the coil 58 is guided to the yoke member 60, which is a ferromagnetic material, and the leakage of the magnetic flux toward the outer side in the axial direction or the outer circumferential side is suppressed. In addition, although the magnetic flux guided by the yoke member 60 is released from the opening ends of the two sides in the axial direction on the inner circumferential side of the yoke member 60 to the outside of the yoke member 60, the magnetic flux concentration members 42, 42 and the intermediate sleeve 24 formed by a ferromagnetic material are arranged to be relatively close to the inner circumferential side of the yoke member 60 via the outer cylindrical member 16 or the seal rubber layer 36 formed by a non-magnetic material. Therefore, the magnetic flux generated by supplying power to the coil 58 is guided to the magnetic flux concentration members 42, 42 and the intermediate sleeve 24 from the inner circumferential side of the yoke member 60 and forms a magnetic path on the inner circumferential side of the coil 58.

Here, the magnetic flux concentration members 42, 42 forming such magnetic path are separated by the orifice path 40, and the opposite surfaces of the pair of magnetic flux concentration members 42 in the axial direction form magnetic pole surfaces which sandwich the orifice path 40 on the magnetic path and are opposite to each other. In addition, in the intermediate sleeve 24 as well, the magnetic path is separated at a position corresponding to the orifice path 40 by the magnetic field acting opening part 32. Therefore, the magnetic poles applied to the opposite surfaces of the magnetic flux concentration members 42, 42 in the axial direction, which are the magnetic pole surfaces, may be prevented from escaping to the intermediate sleeve 24. Moreover, even if there is a magnetic flux guided from the yoke member 60 to the intermediate sleeve 24, by increasing the magnetic path resistance on the intermediate sleeve 24 by using the magnetic field acting opening part 32, such magnetic flux is also easily guided to the magnetic flux concentration members 42, 42. As a result, the magnetic flux density between the opposite surfaces of the magnetic flux concentration members 42, 42 in the axial direction, which form the magnetic pole surfaces sandwiching the orifice path 40 and opposite to each other, can be increased.

In addition, the intermediate sleeve 24 includes two cylindrical side portions 29, 29 in the axial direction. Such side portions 29, 29 in the axial direction are integrally connected, and the groove-like part 28 is formed. Therefore, the magnetic flux released from the opening ends of the two sides of the yoke member 60 in the axial direction throughout the entire circumference in the circumferential direction is also captured by the two cylindrical side portions 29, 29 in the axial direction, and guided from the groove-like parts 28 to the orifice path 40 between the opposite surfaces of the magnetic flux concentration members 42, 42, thereby allowing the magnetic force to the magnetic functional fluid 39 to function more efficiently.

In this way, in the engine mount 10 of the embodiment, the magnetic flux generated by supplying power to the coil 58 is concentrated to and acted upon the orifice path 40, and a large magnetic force can be applied to the magnetic functional fluid 39 flowing through the orifice path 40. In brief, a magnetic energy applied to the magnetic functional fluid 39 of the orifice path 40 with respect to the power energy supplied to the magnetic field generation unit 56 can be efficiently obtained.

It is noted that the specific shape, such as the path cross-sectional area, the length, etc., of the orifice path 40 may be tuned as appropriate, so that the fluid flowing behavior corresponding to the required vibration damping properties are exerted, and the specific shape is not particularly limited.

In addition, by forming such orifice path 40 between the opposite surfaces of the magnetic flux concentration members 42 throughout the entire length as shown in the embodiment, it is possible to increase the effect of magnetic force with respect to the magnetic functional fluid 39 in the orifice path 40. However, the disclosure is not limited to such configuration. For example, the magnetic flux concentration members 42, 42 may also be partially arranged in the length direction of the orifice path 40. Moreover, in addition to forming the respective entire surfaces of the pair of opposite surfaces in the path cross-section of the orifice path 40 by using the magnetic flux concentration members 42, 42, it may also be that the pair of opposite surfaces in the path cross-section of the orifice path 40 are partially formed by using the magnetic flux concentration members 42, 42.

It is noted that, regarding the ends of the respective magnetic flux concentration members 42 on the outer sides in the axial direction, one that is close to the corresponding opening end of the yoke member 60 on the inner circumferential side in the axial direction is favorable from the perspective of concentrating the magnetic flux or reducing the magnetic resistance on the magnetic path. For example, it may be configured that each magnetic flux concentration member 42 is at least partially overlapped with each opening end of the yoke member 60 on the inner circumferential side in the projection of the radial direction. In addition, in the embodiment, the end of each magnetic flux concentration member 42 on the outer side in the axial direction is separated on the inner side in the axial direction with respect to each opening end of the yoke member 60 on the inner circumferential side, and the two components are not overlapped in the projection of the radial direction. However, the amount of such separation in the axial direction defined as D may be small. With respect to the opening width, defined as B, of the yoke member 60 on the inner circumferential side, it may be set that $D \leq (\frac{2}{3})B$.

In addition, regarding the point of facilitating the acting of the magnetic field on the magnetic functional fluid 39 in the orifice path 40 by providing a magnetic gap-like magnetic path separation part arranged in the region where the magnetic field generated by the magnetic field generation unit 56 acts and located at a position corresponding to the orifice path 40, the opposite surfaces between the magnetic flux concentration member 42, 42 and the magnetic field acting opening part 32 of the intermediate sleeve 24 can also be substantially considered as the same.

Therefore, such magnetic field acting opening part 32 of the intermediate orifice 24 is located on the inner circumferential side of the orifice path, and formed at a position corresponding to the orifice path, so as to be overlapped with the orifice path in the projection of the radial direction. Specifically, although the size and the shape of the magnetic field acting opening part 32 are not particularly limited, the width dimension of the magnetic field acting opening part 32 in the axial direction may be set to be a path width of the orifice path 40 or more, considering the increase rate of the magnetic flux acting on the orifice path 40. In particular, in the embodiment in which the orifice path 40 is formed between the opposite surfaces of the pair of magnetic flux concentration members 42, 42, the concentration of the magnetic flux to the magnetic flux concentration members 42, 42 is considered, and the width dimension of the magnetic field acting opening part 32 in the axial direction may be set to be greater than the distance between the opposite surfaces of the pair of magnetic flux concentration members 42, 42.

In addition, considering the increase rate of the magnetic flux acting on the orifice path 40, the magnetic field acting opening part 32 may be formed in a length throughout the entire length of the orifice path 40 in the path length direction (the mount circumferential direction in the embodiment) of the orifice path 40. Specifically, the magnetic field acting opening part 32 is not required to extend throughout the entire length of the orifice path, but may be located on a portion of the entire length. The magnetic field acting opening part 32 may be set, as appropriate, to extend through a length of a half or more of the orifice path in the length direction, extend through a length of 60% or more of the orifice path in the length direction, or extend through a length of 80% or more of the orifice path in the length direction. Therefore, in the embodiment, in the central portion of the orifice path excluding the two end portions, the magnetic field acting opening part 32 extends through the length of substantially 80% of the entire length of the orifice path.

On the two side portions of the magnetic field acting opening part 32 in the axial direction, the intermediate sleeve 24 is overlapped with the respective opening ends of the yoke members 60 on the inner circumferential side in the projection of the radial direction. Specifically, in the embodiment, the side portions 29, 29 in the axial direction set with a large diameter in the intermediate sleeve 24 are arranged to be overlapped with the respective opening ends of the yoke member 60 on the inner circumferential side in the projection of the radial direction. Accordingly, the leaked magnetic flux exiting a closed set magnetic path (the magnetic path going through the magnetic flux concentration members 42, 42 or the intermediate sleeve 24 and the orifice path 40) from the yoke member 60 and released to the outside is reduced.

The engine mount 10 of the embodiment configured as the above is installed to a vehicle, for example, by installing the inner shaft member 14 to a power unit 68 as a component on a side in vibration damping linkage, and installing the cylindrical cover member 46 fixed to the outer cylindrical member 16 to a vehicle body 70 as a component on the other side in vibration damping linkage. The cylindrical cover member 46, for example, is pressed into a mounting hole 72 of the vehicle body 70 and fixed to the vehicle body 70. The inner shaft member 14 may also be installed to the power unit 68 via an inner bracket not shown herein. Likewise, the cylindrical cover member 46 may also be installed to the vehicle body 70 via an outer bracket not shown herein.

In the installation state of the engine mount 10 to the vehicle as the above, when a vibration in the upper-lower direction in which the fluid chambers 38, 38 are disposed to be opposite to each other is input to the engine mount 10, a flow of the filled fluid (the magnetic functional fluid 39) passing through the orifice path 40 between the fluid chambers 38, 38 is generated, and a vibration damping effect is exerted based on the flowing behavior of the fluid.

In the engine mount 10, by controlling the magnetic field applied to the magnetic functional fluid 39 as the filled fluid flowing through the orifice path 40 by controlling the power supplied to the coil 58 by using the magnetic field generation unit 56, it is possible to control the rheological degree of the magnetic function fluid 39. Specifically, in the magnetic field generation unit 56, the magnetic field formed on the circumference of the coil 58 and applied to the inside of the mount body 12 through the yoke member 60 by supplying power to the coil 58, as described above, acts efficiently and intensively on the magnetic functional fluid 39 inside the orifice path 40 by using the magnetic flux concentration members 42, 42 arranged at the positions corresponding to the orifice path 40 and the intermediate sleeve 24 including the magnetic field acting opening parts 32.

In addition, since the rheological degree of the magnetic functional fluid 39 changes in accordance with the magnitude of the applied magnetic field, through the ON/OFF of power supply or the stepwise or continuous regulation of the power supply amount to the coil 58, the rheological properties of the magnetic functional fluid 39 inside the orifice 40 is controlled, and the flowing behavior of the magnetic functional fluid 39 passing through the orifice 40 is controlled. Thus, the properties (vibration damping properties) of the engine mount 10 can be switched and controlled. The modes for switching the properties of the engine mount 10 are not particularly limited, and the properties can be switched in a stepwise or switched steplessly in a continuous manner among two or more multiple modes, so that the required vibration damping properties are satisfied.

In particular, in the embodiment, since it is possible to efficiently obtain the magnetic energy applied to the magnetic functional fluid 39 of the orifice path 40 with respect to the power energy supplied to the magnetic field generation unit 56 as described above, the switching control of the vibration damping properties of the mount 10 is easily realized as a large property change with a favorable energy efficiency.

In addition, in the engine mount 10 of the embodiment, the magnetic field generation unit 56 is arranged apart from the fluid filled region and on the outer circumferential side of the outer cylindrical member 16, and is configured as a configuration separate from the outer body 12, so the configuration including the magnetic field generation unit 56 is simplified, and the configuration of supplying power to the magnetic field generation unit 56 can be formed independently from the mount body 12, thus making the manufacture or management easy.

In FIGS. 5 to 6, as a second embodiment of a fluid-filled vibration damping device configured according to the disclosure, an engine mount 80 of an automotive is shown. The engine mount 80 of the embodiment illustrates a mode differs from the first embodiment in the configuration of the orifice path and the path length of the orifice path, and components and portions substantially the same as those of the first embodiment are labeled with the same symbols as the first embodiment, and the description thereof will be omitted.

As can be told from FIG. 7 illustrating the mount body 12 with the outer cylindrical member 16 removed, the engine mount 80 of the embodiment includes a pair of orifice members 82, 82 forming one orifice path 81 long in the circumferential direction by being serially assembled with each other in the circumferential direction. Such pair of orifice members 82, 82 are used in place of each pair of the magnetic flux concentration members 42, 42 in the engine mount 10 of the first embodiment.

That is, each orifice member 82 is formed by using a material (ferromagnetic material) same as the magnetic flux concentration member of the first embodiment, and is in a substantially semi-cylindrical shape having a length in the circumferential direction less than a half of the circumference as a whole. In addition, the pair of orifice members 82, 82 are abutted at an end in the circumferential direction, and are installed to the integrally vulcanized molded article of the main rubber elastic body 18 in a state of extending along the outer circumferential portion in a length less than one turn of the circumference.

In such installed state, the end in the circumferential direction where the pair of orifice members 82, 82 abutted with each other is fit into one (right side in FIG. 6) of the groove-like parts 28 in the intermediate sleeve 24. The pair of orifice members 82, 82 at the other end in the circumferential direction are both fit into the end of the other groove-like part 28 (left side in FIG. 6) of the intermediate sleeve 24 in the circumferential direction. In the other groove-like part 28 of the intermediate sleeve 24, a partition rubber 84 is formed to protrude throughout the entire length in the groove width direction at the intermediate portion in the circumferential direction. In addition, by positioning the other ends of the pair of orifice members 82, 82 in the circumferential direction respectively on the two sides sandwiching the partitioning rubber 84 in the circumferential direction, the respective ends of the pair of orifice members 82, 82 in the circumferential direction are held in the state of being abutted.

As shown in FIG. 8, in each orifice member 82, wide protrusion parts 86, 86 protruding in the width dimension (the dimension in mount the axial direction) are provided in the intermediate portion in the circumferential direction, and the intermediate portion in the circumferential direction is greater than the side portions in the circumferential direction.

In addition, in each orifice member 82, a continuous hole 88 continuously extending in the circumferential direction from the ends abutted against each other in the circumferential direction to the vicinity the other end is formed to penetrate through the inside and the outside. In addition, on the side of the other end of the orifice member 82 in the circumferential direction, a through hole 90 having a substantially rectangular shape and a wide width is formed to penetrate through the inner surface and the outer surface, and a terminal of the continuous hole 88 is open to the through hole 90. Moreover, a bottom member 92 formed by a non-magnetic material such as a rubber elastic body or synthetic resin is fixed to the opening part of the continuous hole 88 on the inner circumferential side to block the opening part in a fluid-tight manner. Accordingly, the continuous hole 88 is substantially configured in a concave groove configuration.

In the embodiment, in place of the magnetic flux concentration members 42, 42 in the first embodiment, such pair of orifice members 82, 82 are fit and installed to the groove-like parts 28, 28 of the intermediate sleeve 24. Accordingly, the continuous holes 88, 88 of the pair of orifice members 82, 82 are connected in series in the circumferential direction, and one orifice path 81 extending along the inner circumferential surface of the outer cylindrical member 16 in the circumferential direction in a length equal to or greater than a half of the circumference is formed. The two ends of the orifice path 81 in the circumferential direction are respectively in communication with the respective fluid chambers 38 through the through holes 90 formed in the respective orifice members 82.

In such engine mount 80 of the embodiment, by separating the orifice member 82 formed by a single component to the two sides in the axial direction (the orifice width direction) by using the continuous hole 88 in the portion where the orifice path 81 is formed, a pair of magnetic flux concentration parts 94, 94 spaced apart from each other by a predetermined distance and located at opposite positions in the axial direction are formed. In addition, the orifice path 81 is formed between the opposite surfaces of the pair of magnetic flux concentration parts 94, 94 formed by a ferromagnetic material.

Accordingly, in the engine mount 80 of the embodiment, like the engine mount of the first embodiment, it is possible to efficiently control the rheological properties of the magnetic functional fluid 39 by using the magnetism from the magnetic field generation unit 56, and the switching control of the vibration damping properties can be realized with favorable energy efficiency based on the fluid flowing behavior through the orifice path 81.

Specifically, since the orifice path 81 with a path length greater than the orifice path 40 of the first embodiment is realized in the embodiment, the tuning freedom degree of the orifice path 81 can be facilitated, and the vibration damping properties can be further changed by applying the magnetic field generated by the magnetic field generation unit 56 in the annular shape to the magnetic functional fluid 39 in the orifice path 81 throughout a wide range in the circumferential direction.

Also, in the embodiment, in the wide protrusion parts 86, 86 formed in the orifice member 82, since the pair of magnetic flux concentration parts 94, 94 are overlapped with the respective opening ends of the yoke member 60 on the inner circumferential side in the projection of the radial direction, the magnetic flux leakage on the magnetic path can be suppressed, and it is possible to more efficiently apply the magnetic field from the yoke member 60 to the magnetic functional fluid 39 in the orifice path 81.

In the orifice member 82 of the embodiment, the pair of magnetic flux concentration parts 94, 94 separated by the continuous hole 88 are formed in an integral and continuous single-component configuration on the outer circumferential edge of the through hole 90 provided at an end in the circumferential direction. However, for example, the pair of magnetic flux concentration parts 94, 94 may also be configured as separate components that are independent from each other and linked by the bottom member 92. In such case, it is not required to provide the through hole 90, and the decrease in the magnetic force acting on the magnetic functional fluid 39 inside the orifice path 82 due to the wraparound of the magnetic flux through the continuous portion on the outer circumferential edge of the through hole 90 can be avoided.

In addition, regarding the shapes of the magnetic force acting surfaces to the magnetic functional fluid in the orifice path, that is, the opposite surfaces of the pair of magnetic flux concentration members 42, 42 in the first embodiment or the opposite surfaces of the pair of magnetic flux concentration members 94, 94 in the second embodiment, such surfaces are not limited to being parallel and opposite flat surfaces as in the embodiment.

For example, as illustrated in an engine mount 100 as a third embodiment shown in FIGS. 9 to 10, it is possible to adopt opposite surfaces not parallel to each other in the pair of magnetic flux concentration parts 94, 94. In the engine mount 100 of the embodiment, components and members in the same configuration as those of the second embodiment are labeled with the same reference symbols as the second embodiment in the drawings, and the detailed description thereof will be omitted.

That is, although an orifice member 102 in the engine mount 100 of the embodiment has substantially the same configuration as the orifice member 82 of the second embodiment, opposite surfaces 104, 104 of the pair of magnetic flux concentration parts 94, 94 formed by two sidewall surfaces of the orifice path 81 are opposite surfaces not parallel to each other, and the path cross-section of the orifice path 81 is configured in a shape other than the rectangular shape.

Specifically, in the embodiment, the opposite surfaces 104, 104 of the pair of magnetic flux concentration parts 94, 94 forming the sidewall surfaces of the orifice path 81 are arranged as surfaces separated from each other and gradually inclined from the inner circumferential side toward the outer circumferential side. As a result, the shape of the path cross-section of the orifice path 81 is substantially in a table shape.

Meanwhile, when the opposing distance between the opposite surfaces 104, 104 of the pair of magnetic flux concentration parts 94, 94 increases from the inner circumferential side toward the outer circumferential side as in the embodiment, the magnetic flux applied between the pair of opposite surfaces 104, 104 is more likely to be guided to the inner circumferential side than the outer circumferential side in the orifice path 81, and a stronger magnetic field can be applied to the magnetic functional fluid flowing on the inner circumferential side than the magnetic functional fluid flowing on the outer circumferential side in an orifice path 112.

In this way, with the magnitude of the magnetic field applied to the magnetic functional fluid in the orifice path 112 being different in the radial direction, for example, it is possible to control the flowing state of the magnetic functional fluid in the orifice path 112, for example. Specifically, for example, if the rheological degree of the magnetic functional fluid is smaller in the outer circumferential portion of the orifice path 112, where the flow path of the magnetic functional fluid is longer, than the inner circumferential portion, an effect such as suppressing the occurrence of turbulence due to different flow paths in the orifice path 112 can also be expected.

Specifically, regarding the setting of the path cross-section shape of the orifice path 81, the shape is not limited to being set in a table shape as in the embodiment. For example, it can also be that only one of the path wall surfaces in the opposing direction is inclined, and any shape, such as a curved surface, can also be applied to the opposite surface 104 in the orifice path 81.

Moreover, in the first to third embodiments, in the groove-like parts 28 of the intermediate sleeve 24, one orifice path 40, 81, 102 extending linearly in the circumferential direction is formed. However, a specific mode or configuration including the length or the cross-sectional area of the orifice path is not limited thereto. In addition, as mentioned above, the magnetic flux concentration member disposed in the orifice path is not necessary required in the disclosure. However, the specific mode, including the shape or the size of the magnetic flux concentration member that is adopted is not particularly limited.

For example, as illustrated in an engine mount 110 as a fourth embodiment shown in FIG. 11, it is possible to form two orifice paths 112, 112 formed in the groove-like part 28 of the intermediate sleeve 24 and extending in the circumferential direction extending substantially in parallel with respect to the orifice groove 41. The engine mount 110 of the embodiment illustrates a mode different from the first embodiment in the orifice configuration, but the fundamental configuration is the same as the first embodiment. Therefore, only a portion of a longitudinal cross-section demonstrating the properties is shown, and, in such illustration, components and portions configured substantially the same as the first embodiment are labeled with the same reference symbols, and detailed description thereof are omitted.

That is, in the engine mount 110 of the embodiment, the magnetic flux concentration member 114 as an orifice member forming the orifice path 112 is configured in a curved plate shape extending in an in an arced manner in the circumferential direction with a substantially constant cross-sectional shape (a substantially rectangular shape in the embodiment). Compared with the orifice groove 41 formed in the groove-like part 28 of the intermediate sleeve 24, such magnetic flux concentration member 114 is configured with a length dimension substantially the same in the circumferential direction, and is arranged throughout the entire length of the orifice groove 41. In addition, the width dimension (mount axial direction dimension) of such magnetic flux concentration member 114 is smaller than the groove width (groove inner dimension) of the orifice groove 41, and the magnetic flux concentration member 114 is arranged at the center of the orifice groove 41 in the width direction. The thickness dimension (mount radial direction dimension) of the magnetic flux concentration member 114 is the same as or slightly greater than the orifice groove 41.

Accordingly, the orifice groove 41 is partitioned by the magnetic flux concentration member 114 in the groove width direction, and the pair of orifice paths 112 located on the two sides of the magnetic flux concentration member 114 in the width direction and extending in the circumferential direction are formed.

In the pair of orifice paths 112, 112, only the wall surface on the side located on the inner side in the mount axial direction, between the two side wall surfaces opposite to each other in the mount axial direction, is formed by the magnetic flux concentration member 114. The wall surface located on the outer side in the mount axial direction is formed by the main rubber elastic body 18 in the groove-like part 28.

In this way, even if only one of the wall surfaces of the orifice path 112 in the path width direction is configured by the magnetic flux concentration member 114, the end surfaces of the magnetic flux concentration member 114 exposed to the orifice paths 112, 112 form magnetic pole surfaces 116, 116 by concentrating the magnetic flux using the magnetic flux concentration member 114 forming the magnetic path of the magnetic field generated by the magnetic field generation unit 56. Therefore, the magnetic force can be efficiently applied to the magnetic functional fluid 39 in each of the orifice paths 112, 112, and the same effect as the above embodiments can be exhibited.

Specifically, in the embodiment, the intermediate sleeve 24 formed by a ferromagnetic material is arranged on the outer side in the mount axial direction with respect to the orifice paths 112 in which the magnetic flux concentration member 114 is arranged on the inner side in the mount axial direction. Therefore, the magnetic flux concentration effect due to the intermediate sleeve 24 also acts on the magnetic functional fluid 39 in the orifice path 112, and synergistic magnetic flux concentration with respect to the magnetic functional fluid 39 in the orifice paths 112 provided between the intermediate sleeve 24 and the magnetic flux concentration member 114 can be expected between the intermediate sleeve 24 and the magnetic flux concentration member 114.

In the engine mount 110 of the embodiment as well, by adopting magnetic flux concentration members (42, 42) located at two end portions in the mount axial direction as shown in the first embodiment together with the magnetic flux concentration member 114 located at the central portion in the mount axial direction in the orifice groove 41, both of the respective opposite inner surfaces of the two orifice paths 112, 112 may also be formed by magnetic flux concentration members.

Meanwhile, although all the first to fourth embodiments adopt the intermediate sleeve 24 formed by a single component through press molding, etc., it is also possible to form such intermediate sleeve 24 in a split structure with two or more components. By adopting the intermediate sleeve 24 in a split structure, it is possible to enjoy the advantage in manufacture or assembling. For example, by splitting the intermediate sleeve at a position corresponding to the portion where the orifice path is formed and separately disposing the split structures in the mount axial direction, the decrease in the magnetic flux acting on the orifice path due to the wraparound of the magnetic flux passing through the intermediate sleeve can be suppressed.

Specifically, as illustrated in (a) to (c) of FIG. 12, for example, it is possible to form the intermediate sleeve 24 with a pair of split sleeves 24a, 24a split at the center in the axial direction along a split line extending in the circumferential direction. In the drawing of another mode of the intermediate sleeve 24 illustrated in the following, for the ease of understanding, the reference symbols same as the above embodiments are used to label the portions same as the above embodiments.

In each split sleeve 24a, only substantially a half of the groove-like part 28 in the axial direction is integrally formed with the side portions 29 in the axial direction in a cylindrical shape with a large diameter. In addition, the pair of split sleeves 24a, 24a are spaced apart by a predetermined distance in the axial direction, and the end surfaces of the groove-like parts 28, 28 are disposed on the outer circumferential surface of the main rubber elastic body in a illustrated state of being located to be opposite in the axial direction.

In such split sleeves 24a, 24a as well, the magnetic field acting opening part 32 same as the above embodiments may also be formed to extend over respective bottom wall portions 30a, However, in the embodiment, considering strength and dimension accuracy of the split sleeves 24a, 24a and processing factors, independent magnetic field acting opening parts 32a, 32a are provided in a state of penetrating through the substantial centers of the respective bottom wall portions 30a, 30a.

Even if the pair of split sleeves 24a, 24a split in the axial direction in this way are adopted as the intermediate sleeve 24 of the above embodiments, the effects same as the above embodiments can be exerted. Specifically, in the split sleeves 24a, 24a of this mode, the side portions in the axial direction are disposed to be separated from each other. Therefore, compared with the case where the split sleeves 24a, 24a in an integral configuration are adopted, the escape (wraparound) of the magnetic flux through the split sleeves 24a, 24a to the outside of the orifice path can be suppressed, and the magnetic flux concentration to the magnetic functional fluid in the orifice path can be further facilitated.

Moreover, it is also possible to adopt a pair of split sleeves 24b, 24b shown in (a) to (c) of FIG. 13, and set a greater separation distance between the pair of split sleeves 24b, 24b in the axial direction at portions corresponding to the orifice path.

In the orifice member 24 of the mode, it is also possible to grasp a configuration in which, in the bottom wall portion 30 of the groove-like part 28 in the orifice member 24 of the first embodiment, the magnetic field acting opening part 32 has a predetermined dimension in the groove width direction (mount axis direction) of the groove-like part 28, and is formed in a length throughout the entire length of the groove-like part 28 in the circumferential direction (groove length direction).

By adopting such split sleeves 24b, 24b, it is possible to set a separation distance between the split sleeves 24b, 24b greater than that of the split sleeves 24a, 24a shown in (a) to (c) of FIG. 12, and it is possible to more effectively suppress the escape (wraparound) of the magnetic flux through the split sleeves 24a, 24a to the outside of the orifice path. In addition, compared with the split sleeve 24a shown in (a) to (c) of FIG. 12, the components are smaller, materials are saved, and the manufacture is also simple as it is not required to form the magnetic field acting opening part 32*a* in each split sleeve 24*a*.

Furthermore, as illustrated in (a) to (c) of FIG. 14, for example, it is possible to form the intermediate sleeve 24 as a pair of split sleeves 24*c*, 24*c*, each configured in a semi-cylindrical shape, such that opposite portions in a direction of the radial direction are respectively split by a split line extending in the axial direction. The intermediate sleeve 24 of the embodiment is configured as the pair of split sleeves 24*c*, 24*c* that are side portions in the radial direction orthogonal to the opposing direction of the groove-like parts 28, 28 and are respectively split by a split line extending in the axial direction. Moreover, although the intermediate sleeve in the mode of (a) to (c) of FIG. 14 is split into two in the circumferential direction, a split configuration splitting the intermediate sleeve into three in the circumferential direction is also possible.

Although the embodiments of the disclosure have been described above in detail, the disclosure is not limited to such detailed description. For example, multiple orifice paths may be disposed. In such case, it suffices as long as the magnetic field is applied from the magnetic field generation unit to the magnetic functional fluid in at least one of the orifice paths.

In the orifice path 40 of the embodiment, the entire orifice path extends in the circumferential direction. However, the orifice path may also partially extend in the axial direction or the radial direction, for example. In such case, the magnetic field of the magnetic field generation unit may be applied to the magnetic functional fluid in the portion of the orifice path extending in the circumferential direction.

In the embodiment, the coil 58 is arranged throughout the entire circumference in the state of being externally inserted to the outer cylindrical member 16. However, it is not required that the coil 58 be arranged coaxially with the outer cylindrical member 16. Specifically, for example, the coil may also be partially arranged toward the outer circumferential side of the outer cylindrical member in the circumferential direction, so that the central axis of the coil is located on an outer circumferential side with respect to the outer cylindrical member. Accordingly, at the time when the coil is supplied with power, the position where the magnetic field acts on the magnetic functional fluid can be limited in the circumferential direction of the outer cylindrical member.

In the above embodiments, the two fluid chambers 38, 38 are both configured to serve as pressure receiving chambers in which an internal pressure changes when a vibration is input. However, for example, one of the fluid chambers may also be configured to serve as a balancing chamber where a portion of a wall part is formed by a flexible film. In addition, the number of the fluid chambers is not limited to two, and a configuration with three or more fluid chambers may also be adopted.

What is claimed is:

1. A vibration damping device, which is a fluid-filled vibration damping device and comprises:
    a main rubber elastic body;
    an inner shaft member;
    an intermediate cylindrical member, wherein the inner shaft member and the intermediate cylindrical member are linked by the main rubber elastic body;
    an outer cylindrical member, externally inserted and fixed to the intermediate cylindrical member;
    a plurality of fluid chambers, separated in a circumferential direction, formed by covering pocket-like parts provided at the main rubber elastic body and open to an outer circumferential side of the intermediate cylindrical member by using the outer cylindrical member; and
    an orifice path, allowing the fluid chambers to communicate with each other,
    wherein a magnetic functional fluid is filled into the fluid chambers,
    a magnetic field generation unit applying a magnetic field to the magnetic functional fluid flowing through the orifice path is provided outside the fluid chambers,
    the outer cylindrical member is formed by a non-magnetic material,
    the intermediate cylindrical member is formed by a ferromagnetic material, and
    in the intermediate cylindrical member, a magnetic field acting opening part is provided at a position corresponding to the orifice path in which the magnetic field is applied to the magnetic functional fluid,
    wherein the intermediate cylindrical member comprises:
        a pair of side portions in an axial direction, configured in a cylindrical shape with a diameter that is continuous in the circumferential direction; and
        an intermediate portion in the axial direction, partially provided in the circumferential direction, and having a concave groove shape extending in the circumferential direction between the pair of side portions in the axial direction,
    wherein the magnetic field acting opening part is provided at the intermediate portion in the axial direction, and the magnetic field acting opening part penetrates through the intermediate portion in a radial direction.

2. The vibration damping device as claimed in claim 1, wherein the intermediate cylindrical member is a single component formed by the pair of side portions in the axial direction connected at the intermediate portion in the axial direction, and
    the magnetic field acting opening part is configured by a window part formed to penetrate through a groove bottom part in the intermediate portion in the axial direction that is configured in the concave groove shape.

3. The vibration damping device as claimed in claim 1, wherein the intermediate cylindrical member is configured in a split configuration on two sides in the axial direction in the intermediate portion in the axial direction, and the pair of side portions in the axial direction are separate components, and
    the magnetic field acting opening part is configured between split parts of the intermediate portion in the axial direction separated in the axial direction.

4. The vibration damping device as claimed in claim 1, wherein the magnetic field generation unit is arranged on an outer circumferential side of the outer cylindrical member.

5. The vibration damping device as claimed in claim 1, wherein in the orifice path, magnetic flux concentration members formed by a ferromagnetic material are disposed to be opposite to each other in a width direction of the orifice path, and the magnetic field acting opening part in the intermediate cylindrical member is provided at a position corresponding to a portion between opposite parts in the magnetic flux concentration members.

6. The vibration damping device as claimed in claim 5, wherein between the intermediate cylindrical member and the outer cylindrical member, an orifice member for forming the orifice path is arranged to extend, in the circumferential direction, along the pocket-like part provided in the main rubber elastic body, the orifice member is formed by a ferromagnetic material, and the magnetic flux concentration members disposed to be opposite to each other in the width direction of the orifice path are formed by the orifice member.

7. The vibration damping device as claimed in claim 1, wherein the magnetic field generation unit comprises:

a coil member, generating a magnetic field by being supplied with power, and a yoke member, guiding a magnetic flux in the magnetic field generated by the coil member to the orifice path.

8. The vibration damping device as claimed in claim 1, wherein the magnetic field generation unit is arranged on an outer circumferential side of the outer cylindrical member.

9. The vibration damping device as claimed in claim 1, wherein in the orifice path, magnetic flux concentration members formed by a ferromagnetic material are disposed to be opposite to each other in a width direction of the orifice path, and the magnetic field acting opening part in the intermediate cylindrical member is provided at a position corresponding to a portion between opposite parts in the magnetic flux concentration members.

10. The vibration damping device as claimed in claim 1, wherein the magnetic field generation unit comprises:

a coil member, generating a magnetic field by being supplied with power, and a yoke member, guiding a magnetic flux in the magnetic field generated by the coil member to the orifice path.

* * * * *